(12) United States Patent
Brown et al.

(10) Patent No.: US 11,760,683 B2
(45) Date of Patent: Sep. 19, 2023

(54) GLASS MANUFACTURING APPARATUS AND METHODS FOR SEPARATING A GLASS RIBBON

(71) Applicant: Corning Incorporated, Corning, NY (US)

(72) Inventors: James William Brown, Painted Post, NY (US); Weiwei Luo, Painted Post, NY (US); Naiyue Zhou, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 454 days.

(21) Appl. No.: 16/650,627

(22) PCT Filed: Sep. 24, 2018

(86) PCT No.: PCT/US2018/052442
§ 371 (c)(1),
(2) Date: Mar. 25, 2020

(87) PCT Pub. No.: WO2019/067361
PCT Pub. Date: Apr. 4, 2019

(65) Prior Publication Data
US 2020/0223735 A1   Jul. 16, 2020

Related U.S. Application Data

(60) Provisional application No. 62/563,287, filed on Sep. 26, 2017.

(51) Int. Cl.
*C03B 17/06* (2006.01)
*C03B 33/02* (2006.01)

(52) U.S. Cl.
CPC ........ *C03B 33/0215* (2013.01); *C03B 17/064* (2013.01)

(58) Field of Classification Search
None
See application file for complete search history.

(56) References Cited

U.S. PATENT DOCUMENTS

| 3,567,086 A | * | 3/1971 | Wark | B23D 31/002 |
| | | | | 225/2 |
| 3,592,370 A | * | 7/1971 | Boardman | C03B 33/10 |
| | | | | 225/2 |

(Continued)

FOREIGN PATENT DOCUMENTS

| CN | 101193731 B | 11/2010 |
| EP | 0003392 A1 | 8/1979 |

(Continued)

OTHER PUBLICATIONS

Chinese Patent Application No. 201880068020.9, Office Action dated Mar. 2, 2022, 22 pages (13 pages of English Translation and 9 pages of Original document), Chinese Patent Office.

(Continued)

*Primary Examiner* — Jodi C Franklin
(74) *Attorney, Agent, or Firm* — Matthew J. Mason

(57) ABSTRACT

A glass manufacturing apparatus can include a first elongated member, a second elongated member, and an elongated anvil member aligned with a space disposed between the first elongated member and the second elongated member. Methods can include rotating the first elongated member and the second elongated member while the elongated anvil member contacts a first major surface of the glass ribbon. In another embodiment, a glass manufacturing apparatus can include a first and second row of suction cups, and an elongated anvil member. The elongated anvil member can be engaged with a first major surface of the glass ribbon between the first and second row of suction cups that are attached to the first major surface of the glass ribbon. The glass manufacturing apparatus is configured to produce a (Continued)

score line on the second major surface of the glass ribbon along the elongated anvil member.

16 Claims, 12 Drawing Sheets

(56) References Cited

U.S. PATENT DOCUMENTS

| | | | | |
|---|---|---|---|---|
| 4,004,723 A * | 1/1977 | Kabanov | ............... | C03B 33/033 225/103 |
| 4,049,167 A * | 9/1977 | Guissard | ............... | C03B 33/033 225/2 |
| 4,109,841 A * | 8/1978 | DeTorre | ............... | C03B 33/033 225/2 |
| 4,202,681 A | 5/1980 | McMaster et al. | | |
| 4,221,150 A * | 9/1980 | Bergfelt | ................ | C03B 33/10 83/564 |
| 4,489,870 A * | 12/1984 | Prange | ................ | C03B 33/033 225/2 |
| 5,165,585 A * | 11/1992 | Lisec | .................. | C03B 33/033 225/2 |
| 5,303,861 A * | 4/1994 | Allaire | ................ | C03B 33/033 225/2 |
| 5,480,081 A * | 1/1996 | Wilson | .................. | B28D 1/225 83/886 |
| 5,611,834 A * | 3/1997 | Walter | ................. | C03B 23/112 65/102 |
| 5,871,134 A * | 2/1999 | Komagata | ............ | C03B 33/033 225/2 |
| 7,260,959 B2 * | 8/2007 | Chang | ................ | C03B 33/0215 65/25.2 |
| 7,895,861 B2 * | 3/2011 | Chalk | ................ | C03B 33/0215 65/93 |
| 8,245,539 B2 * | 8/2012 | Lu | ........................ | C03B 33/033 65/97 |
| 8,292,141 B2 | 10/2012 | Cox et al. | | |
| 8,484,995 B2 * | 7/2013 | Delia | ................ | C03B 17/068 65/195 |
| 8,870,046 B2 * | 10/2014 | Hill | .................... | C03B 33/0215 225/2 |
| 9,027,815 B2 * | 5/2015 | Kudva | ................. | C03B 33/033 225/2 |
| 9,126,857 B2 * | 9/2015 | Hill | ..................... | B28D 5/0029 |
| 9,828,276 B2 * | 11/2017 | Brown | ............... | C03B 33/0215 |
| 10,018,575 B2 * | 7/2018 | Smith | ................. | G01N 21/909 |
| 10,138,155 B2 * | 11/2018 | Joseph, II | ............ | C03B 21/04 |
| 10,543,576 B2 | 1/2020 | Qaroush et al. | | |
| 11,214,449 B2 * | 1/2022 | Chou | ................ | C03B 35/24 |
| 2003/0029849 A1 * | 2/2003 | Trinks | ................... | B41M 5/262 219/121.61 |
| 2003/0029894 A1 * | 2/2003 | Crane | .................. | B60R 9/00 224/315 |
| 2004/0074366 A1 * | 4/2004 | Choo | ..................... | C03B 33/03 83/886 |
| 2006/0042314 A1 * | 3/2006 | Abbott | .................. | C03B 17/06 65/195 |
| 2006/0249553 A1 | 11/2006 | Ukrainczyk | | |
| 2006/0261118 A1 * | 11/2006 | Cox | ..................... | C03B 33/0215 225/96 |
| 2007/0214925 A1 * | 9/2007 | Nishio | ................ | B28D 5/0011 83/559 |
| 2009/0250497 A1 * | 10/2009 | Cox | ..................... | C03B 33/0215 225/2 |
| 2010/0065599 A1 * | 3/2010 | Nishisaka | ............ | C03B 33/033 83/879 |
| 2011/0094267 A1 * | 4/2011 | Aniolek | ................ | C03B 17/065 65/91 |
| 2011/0277507 A1 * | 11/2011 | Lu | ........................ | C03B 33/0215 65/97 |
| 2012/0103018 A1 * | 5/2012 | Lu | ........................ | C03B 33/0215 65/53 |
| 2014/0352356 A1 * | 12/2014 | Anderson | ............. | C03B 17/068 65/185 |
| 2015/0284284 A1 * | 10/2015 | Konishi | ................ | C03B 33/091 225/2 |
| 2016/0137543 A1 * | 5/2016 | Abramov | ............ | C03B 33/0235 225/2 |
| 2016/0152507 A1 * | 6/2016 | Brown | .................. | B25B 11/005 269/21 |
| 2017/0174549 A1 | 6/2017 | Hajcak et al. | | |
| 2018/0148365 A1 * | 5/2018 | Brown | ................. | C03B 33/033 |
| 2019/0077695 A1 * | 3/2019 | Brown | ............... | C03B 33/0235 |
| 2022/0267187 A1 * | 8/2022 | Li | .......................... | C03B 17/064 |

FOREIGN PATENT DOCUMENTS

| | | | | |
|---|---|---|---|---|
| JP | 2008-540325 A | 11/2008 | | |
| JP | 2012-096988 A | 5/2012 | | |
| JP | 2014-162682 A | 9/2014 | | |
| JP | 2017114686 A * | 6/2017 | ............. | C03B 17/06 |
| TW | 201223886 A | 6/2012 | | |
| TW | 201544470 A | 12/2015 | | |
| WO | 2006/124459 A2 | 11/2006 | | |
| WO | 2014132493 A1 | 9/2014 | | |
| WO | 2016104393 A1 | 6/2016 | | |
| WO | 2016104400 A1 | 6/2016 | | |
| WO | 2016/172065 A1 | 10/2016 | | |
| WO | 2017/007782 A1 | 1/2017 | | |
| WO | 2017/075133 A2 | 5/2017 | | |

OTHER PUBLICATIONS

International Search Report and Written Opinion of the International Searching Authority; PCT/US2018/052442; dated Jan. 23, 2019; 15 Pages; European Patent Office.

Japanese Patent Application No. 2020-538757, Office Action, dated Jun. 15, 2022, 9 pages (4 pages of English Translation and 5 pages of Original Copy); Japanese Patent Office.

Taiwanese Patent Application No. 107133782, Office Action dated Jan. 6, 2023, 5 pages (English Translation only), Taiwanese Patent Office.

* cited by examiner

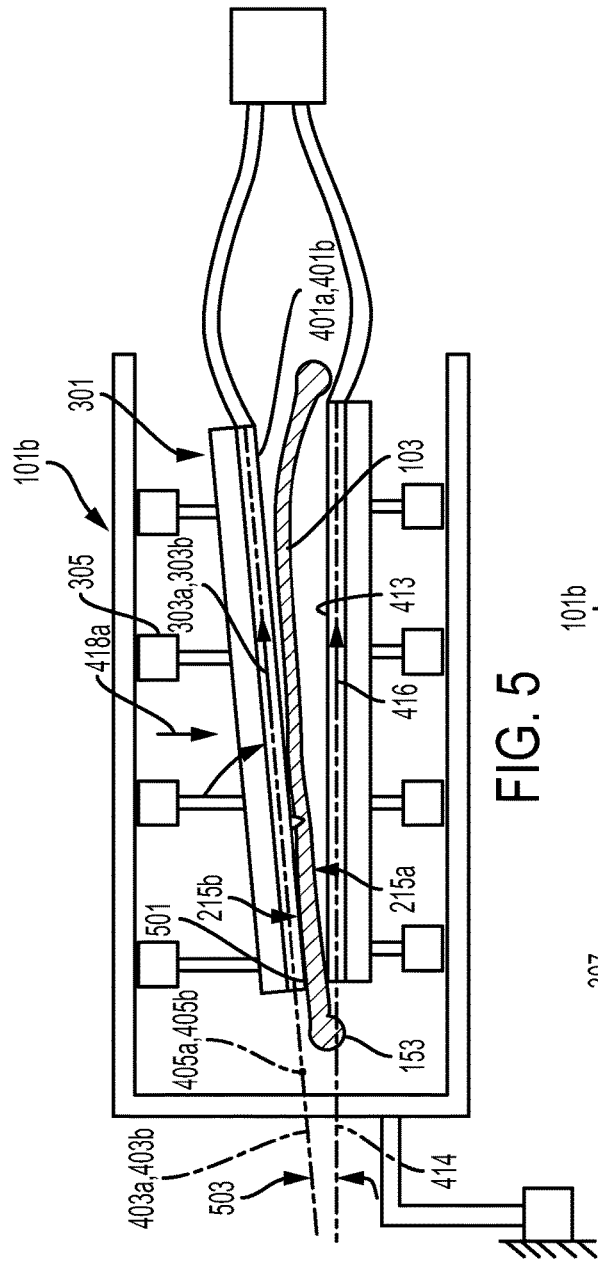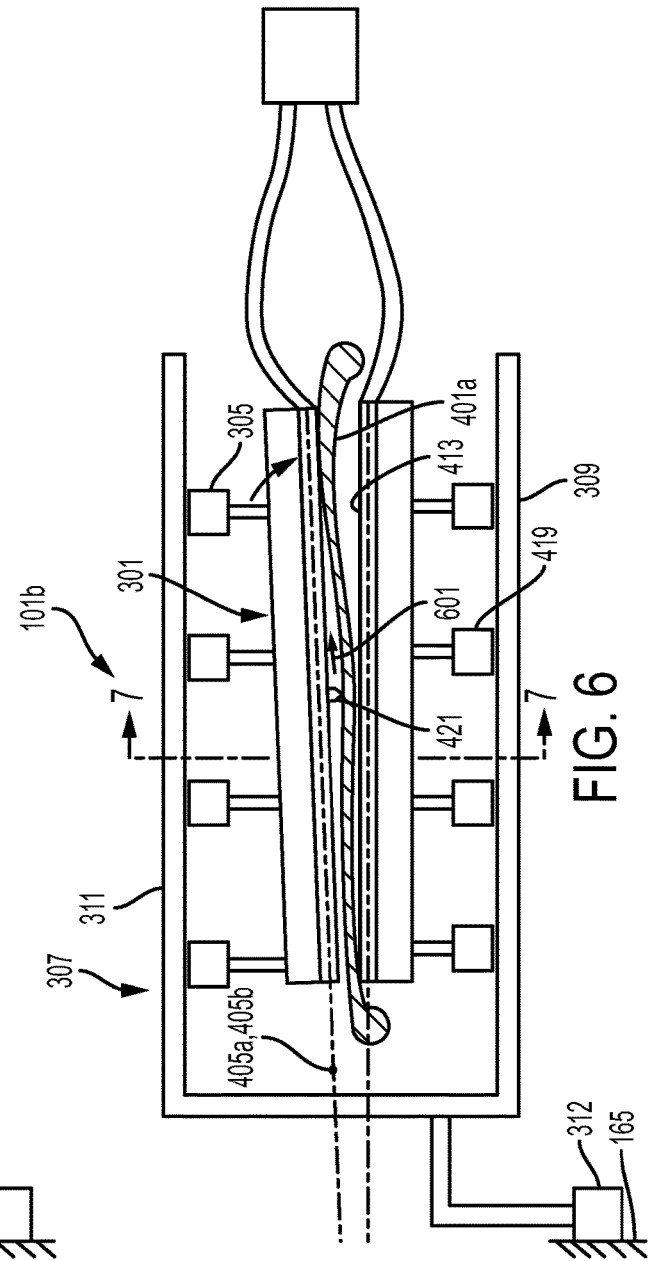

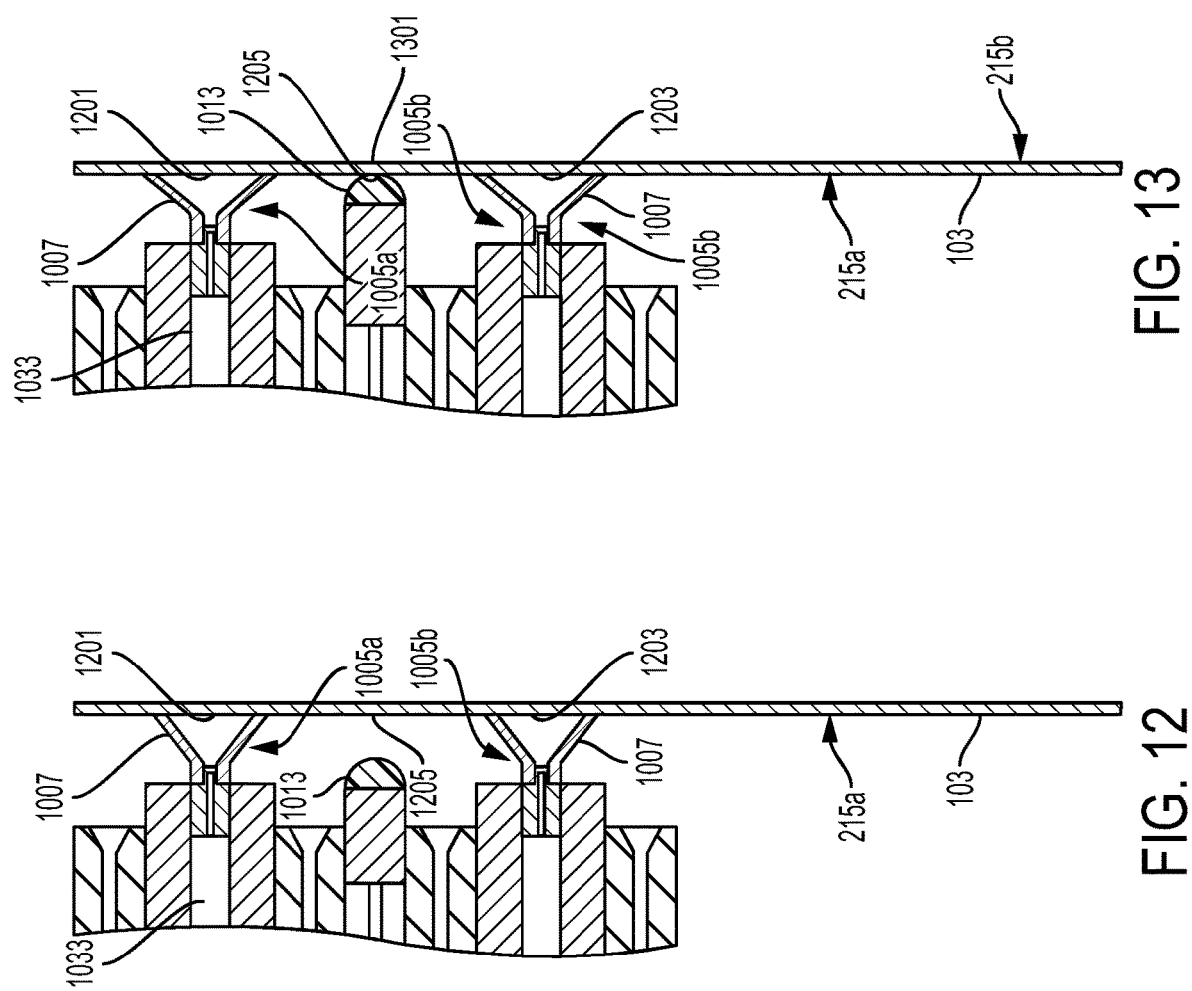

GLASS MANUFACTURING APPARATUS AND METHODS FOR SEPARATING A GLASS RIBBON

This application is a National Stage application under 35 U.S.C. § 371 of International Application No. PCT/US2018/052442 filed on Sep. 24, 2018, which claims the benefit of priority to U.S. Provisional Application Ser. No. 62/563,287 filed on Sep. 26, 2017, the content of each are relied upon and incorporated herein by reference in their entirety.

FIELD

The present disclosure relates generally to glass manufacturing apparatus and methods and, more particularly, to glass manufacturing apparatus and methods for separating a glass ribbon.

BACKGROUND

It is known to separate a glass ribbon by scoring and then bending the ribbon with a separate handling apparatus. Typically, bending the glass ribbon with the handling apparatus generates unnecessary excess bending stress and/or uneven bending stress within the glass ribbon. Upon separation, such excess and/or uneven bending stress can produce vibrations, warping, and/or twisting of the glass ribbon that may propagate up the glass ribbon to cause defects in the glass ribbon as the glass ribbon is formed. Prior separation techniques may result in vibrations, warping, and/or twisting of in the glass ribbon that may propagate up the glass ribbon to the viscous zone and/or setting zone where resulting defects may be frozen into the glass ribbon in the elastic zone.

SUMMARY

The following presents a simplified summary of the disclosure to provide a basic understanding of some embodiments described in the detailed description.

In some embodiments, glass separation apparatus of the present disclosure may achieve separation by concentrating uniform stress along a score line with an elongated anvil without requiring a typical bending operation of the entire glass sheet to be separated below the score line. In some embodiments, only a relatively small movement between the engagement device and the elongated anvil member can achieve stress along the score line that results in separation of the glass sheet from the glass ribbon at the score line. Consequently, application of stress along the score line with the elongated anvil of the present disclosure can avoid excessive stress that may otherwise occur during a typical bending operation, thereby avoiding defects that may result from vibrations, warping, and/or twisting of the glass ribbon propagating up to the viscous zone and/or setting zone where resulting defects may be frozen into the glass ribbon in the elastic zone.

In accordance with some embodiments, a glass manufacturing apparatus can comprise an engagement device comprising: a first elongated member extending along a first elongated axis and rotatable about a first rotation axis extending along a direction at a first nonzero angle relative to a direction of the first elongated axis. The engagement device can further include a second elongated member extending along a second elongated axis and rotatable about a second rotation axis extending along a direction at a second nonzero angle relative to a direction of the second elongated axis. The second elongated member can be spaced from the first elongated member. The glass manufacturing apparatus can further comprise an elongated anvil member aligned with a space disposed between the first elongated member and the second elongated member. At least one of the engagement device and the elongated anvil member can be movable relative to the other of the engagement device and the elongated anvil member.

In one embodiment, the engagement device and the elongated anvil member can be mounted on a carriage.

In another embodiment, the first rotation axis may be coincident with the second rotation axis.

In another embodiment, the first nonzero angle can be 90 degrees and the second nonzero angle can be 90 degrees.

In another embodiment, a common plane extends along the direction of the first elongated axis, the direction of the second elongated axis, the direction of the first rotation axis, and the direction of the second rotation axis.

In another embodiment, the glass manufacturing apparatus can further comprise a scoring element movable relative to the elongated anvil member.

In another embodiment, the scoring element can be movable within the space disposed between the first elongated member and the second elongated member.

In another embodiment the glass manufacturing apparatus can further comprise an actuator to move the elongated anvil member relative to the space disposed between the first elongated member and the second elongated member.

In another embodiment, at least one of the engagement device and the elongated anvil member is provided with a vacuum port.

In another embodiment, a method can be provided for separating a glass ribbon with the glass manufacturing apparatus. The method can include contacting a first major surface of the glass ribbon with the elongated anvil member and contacting a portion of a second major surface of the glass ribbon with the first elongated member and the second elongated member. The method can further include rotating the first elongated member about the first rotation axis and the second elongated member about the second rotation axis while at least partially flattening the glass ribbon and while the elongated anvil member contacts the first major surface of the glass ribbon. The method can further include scoring the second major surface of the glass ribbon to produce a score line within the second major surface of the glass ribbon along a separation path aligned with the elongated anvil member. The method can then include separating the glass ribbon along the score line by moving at least one of the engagement device and the elongated anvil member relative to the other of the engagement device and the elongated anvil member.

In another embodiment, the engagement device and the elongated anvil member may be each mounted on a carriage, and the method can comprise moving the carriage at a speed in a travel direction that matches a speed of the glass ribbon traveling in the travel direction while separating the glass ribbon along the score line.

In another embodiment, at least a portion of scoring of the second major surface of the glass ribbon may be conducted while at least partially flattening the glass ribbon against the elongated anvil member.

In another embodiment, the method can include vacuuming debris during at least one of scoring the second major surface of the glass ribbon and separating the glass ribbon along the score line.

In another embodiment, a glass manufacturing apparatus may comprise an engagement device comprising: a first row of suction cups extending along a first elongated axis; and a second row of suction cups extending along a second elongated axis, wherein each suction cup of the first and second row of suction cups faces a first direction. The glass manufacturing apparatus can further include an elongated anvil member facing the first direction, wherein at least one of the engagement device and the elongated anvil member is movable relative to the other of the engagement device and the elongated anvil member.

In another embodiment, the first row of suction cups, the second row of suction cups and the elongated anvil member may be mounted on a carriage.

In another embodiment, the glass manufacturing apparatus may further comprise a scoring element movable relative to the elongated anvil member.

In another embodiment, the glass manufacturing apparatus may further comprise an actuator to move the elongated anvil member in the first direction.

In another embodiment, at least the elongated anvil member may be provided with at least one vacuum port configured to remove debris while the suction cups of the first and second row of suction cups are each attached to a major surface of a glass ribbon.

In another embodiment, the plurality of suction cups of at least one of the first row of suction cups and the second row of suction cups may be configured in at least a first zone of suction cups and a second zone of suction cups, wherein the first zone of suction cups is configured to operate independently from the second zone of suction cups.

In another embodiment, a method of separating a glass ribbon with the glass manufacturing apparatus can comprise attaching each suction cup of the first row of suction cups to a first area of a first major surface of a glass ribbon and attaching each suction cup of the second row of suction cups to a second area of the first major surface of the glass ribbon. The method can further comprise engaging the elongated anvil member along a third area of the first major surface of the glass ribbon, wherein the third area is positioned between the first area and the second area. The method can further include producing a score line in a second major surface of the glass ribbon along a separation path aligned with the elongated anvil member. The method can then include separating the glass ribbon along the score line by moving at least one of the engagement device and the elongated anvil member relative to the other of the engagement device and the elongated anvil member.

In another embodiment, separating the glass ribbon can produce a glass sheet separated from the glass ribbon, wherein the glass sheet is hung from the second row of suction cups after separating the glass ribbon along the score line.

In another embodiment, the engagement device and the elongated anvil member may be mounted to a carriage, and the method can comprise moving the glass ribbon along a travel direction and moving the carriage at a speed in the travel direction that matches a speed of the glass ribbon traveling in the travel direction while separating the glass ribbon along the score line.

In another embodiment, the plurality of suction cups of at least one of the first row of suction cups and the second row of suction cups may be configured in at least a first zone of suction cups and a second zone of suction cups. The method can include operating the first zone of suction cups independently from the second zone of suction cups.

In another embodiment, the method can further comprise operating the first zone of suction cups at a different pressure than the second zone of suction cups.

In another embodiment, producing the score line can occur at least partially while flattening the glass ribbon against the elongated anvil member.

In another embodiment, the method can further comprise vacuuming debris during at least one of: producing a score line in a second major surface of the glass ribbon; and separating the glass ribbon along the score line.

BRIEF DESCRIPTION OF THE DRAWINGS

These and other features, aspects and advantages are better understood when the following detailed description is read with reference to the accompanying drawings, in which:

FIG. 5 illustrates rotating the first elongated member and second elongated member in accordance with a method of separating a glass ribbon;

FIG. 6 illustrates further rotating the first elongated member and second elongated member and scoring the glass ribbon during a process of separating the glass ribbon;

FIG. 12 is an enlarged view of the second embodiment of the glass separation apparatus taken at view 12 of FIG. 11 and illustrating suction cups of a first row of suction cups attached to a first area of a first major surface of a glass ribbon and suction cups of a second row of suction cups attached to a second area of the first major surface of the glass ribbon;

FIG. 13 is an enlarged view of the second embodiment of the glass separation apparatus similar to FIG. 12 but illustrating an elongated anvil member engaging to third area of the first major surface of the glass ribbon positioned between the first area and the second area;

DETAILED DESCRIPTION

Figure 1:
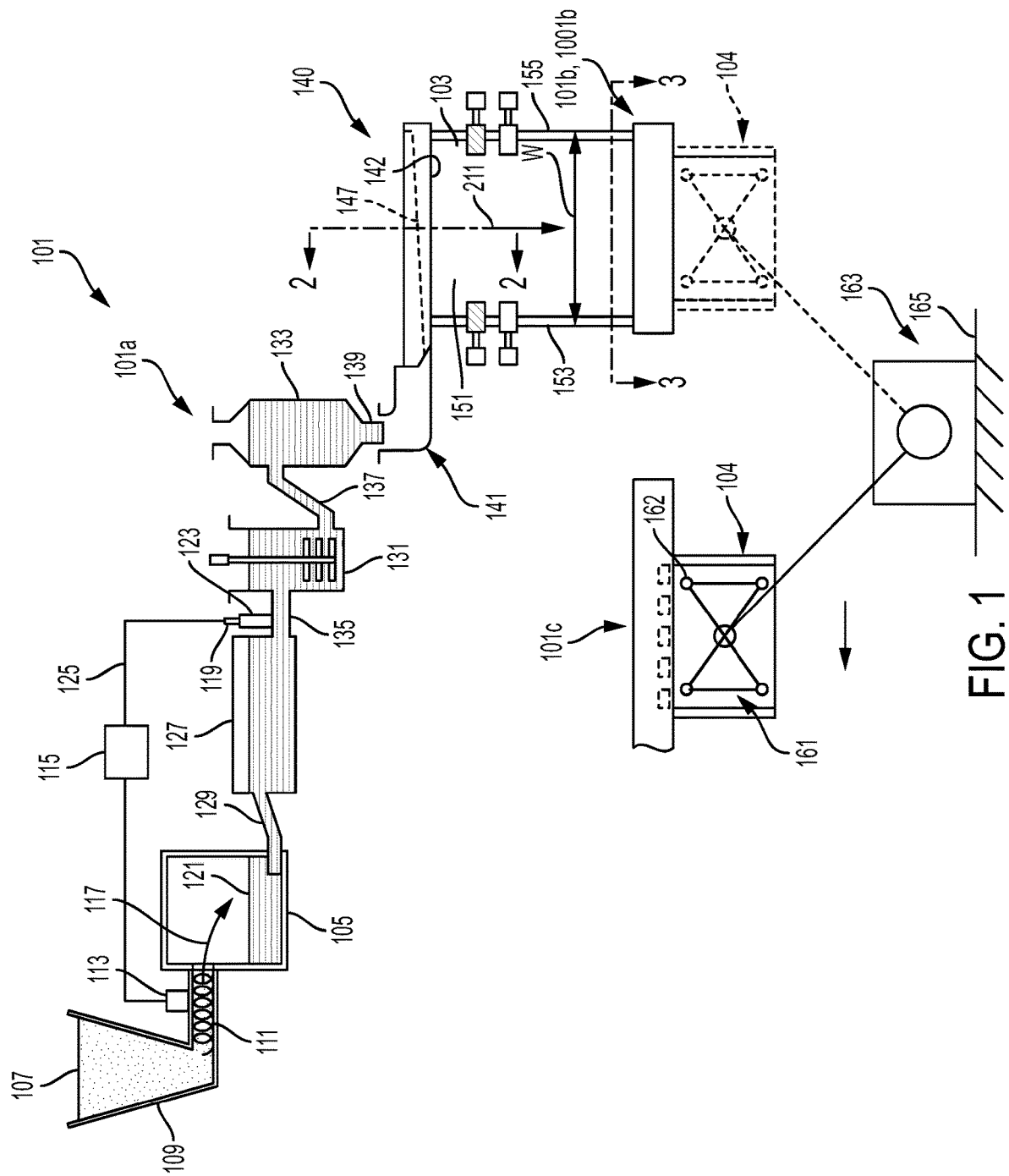
FIG. 1 illustrates a schematic view of an example embodiment of a glass manufacturing apparatus in accordance with the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

It is to be understood that specific embodiments disclosed herein are intended to be exemplary and therefore non-limiting. For purposes of the disclosure, although not required, the glass manufacturing apparatus can optionally comprise a glass forming apparatus that forms a glass sheet and/or glass ribbon from a quantity of molten material. For example, the glass manufacturing apparatus can optionally include a glass forming apparatus such as a slot draw apparatus, float bath apparatus, down-draw apparatus, up-draw apparatus, press-rolling apparatus or other glass forming apparatus. In the embodiment illustrated in FIG. 1 discussed below, the glass manufacturing apparatus can comprise a glass forming apparatus including a fusion down-draw apparatus although other glass forming apparatus maybe provided in further embodiments.

Furthermore, for purposes of the disclosure, although not required, the glass manufacturing apparatus can include a storage device for storing a previous-formed glass ribbon and/or glass sheet. For example, although not shown, the glass manufacturing apparatus may optionally include a storage spool including a length of the glass ribbon wound on the storage spool. In some embodiments, the glass manufacturing apparatus may unwind a portion of the glass ribbon from the storage spool during a method of manufacturing the glass ribbon.

In further embodiments, as discussed below, various apparatus may be provided in-line to continuously manufacture glass at different glass manufacturing stations. For instance, by way of illustration, FIG. 1 demonstrates the glass manufacturing apparatus 101 including various apparatus that may be provided in-line such as a glass forming apparatus 101a designed to form glass ribbon 103, a glass separation apparatus 101b, 1001b to score and separate a glass sheet 104 from the glass ribbon 103, and a glass handling apparatus 101c. For purposes of the disclosure, the glass manufacturing apparatus 101 can include any one or any combination of one or more components such as the illustrated glass forming apparatus 101a, the glass separation apparatus 101b, 1001b, and the glass handling apparatus 101c. Such components are illustrated as an in-line arrangement for continuous manufacturing of a glass ribbon and glass sheet although the components may be provided separately out of line.

The glass ribbon 103 formed by fusion down-draw may comprise a high-quality central portion 151 disposed between opposite relatively thick edge beads formed along a first edge 153 and a second edge 155 of the glass ribbon 103. As shown in FIG. 1, in some embodiments, a glass sheet 104 may be separated from the glass ribbon 103 by the glass separation apparatus 101b, 1001b. Although not shown, before or after separation of the glass sheet 104, the thick edge beads formed along the first edge 153 and the second edge 155 may be removed to liberate the high-quality central portion 151 from the glass ribbon 103. The resulting high-quality central portion 151 may be used in a wide variety of desired display applications, including liquid crystal displays (LCDs), electrophoretic displays (EPD), organic light emitting diode displays (OLEDs), plasma display panels (PDPs), or the like.

FIG. 1 schematically illustrates the exemplary glass manufacturing apparatus 101 including the glass forming apparatus 101a to draw the glass ribbon 103 from a quantity of molten material 121. As illustrated, the glass manufacturing apparatus 101 can include a melting vessel 105 oriented to receive batch material 107 from a storage bin 109. The batch material 107 can be introduced by a batch delivery device 111 powered by a motor 113. An optional controller 115 can be operated to activate the motor 113 to introduce a desired amount of batch material 107 into the melting vessel 105, as indicated by arrow 117. A glass melt probe 119 can be used to measure a level of molten material 121 within a standpipe 123 and communicate the measured information to the controller 115 by way of a communication line 125.

The glass manufacturing apparatus 101 can also include a fining vessel 127 located downstream from the melting vessel 105 and coupled to the melting vessel 105 by way of a first connecting conduit 129. In some embodiments, molten material 121 may be gravity fed from the melting vessel 105 to the fining vessel 127 by way of the first connecting conduit 129. For example, gravity may act to drive the molten material 121 to pass through an interior pathway of the first connecting conduit 129 from the melting vessel 105 to the fining vessel 127. Within the fining vessel 127, bubbles may be removed from the molten material 121 by various techniques.

The glass manufacturing apparatus 101 can further include a mixing chamber 131 that may be located downstream from the fining vessel 127. The mixing chamber 131 can be used to provide a homogenous composition of molten material 121, thereby reducing or eliminating cords of inhomogeneity that may otherwise exist within the molten material 121 exiting the fining vessel 127. As shown, the fining vessel 127 may be coupled to the mixing chamber 131 by way of a second connecting conduit 135. In some embodiments, molten material 121 may be gravity fed from the fining vessel 127 to the mixing chamber 131 by way of the second connecting conduit 135. For instance, gravity may drive the molten material 121 to pass through an interior pathway of the second connecting conduit 135 from the fining vessel 127 to the mixing chamber 131.

The glass manufacturing apparatus 101 can further include a delivery vessel 133 that may be located downstream from the mixing chamber 131. The delivery vessel 133 can condition the molten material 121 to be fed into an inlet conduit 141. For example, the delivery vessel 133 can function as an accumulator and/or flow controller to adjust and provide a consistent flow of molten material 121 to the inlet conduit 141. As shown, the mixing chamber 131 may be coupled to the delivery vessel 133 by way of a third connecting conduit 137. In some embodiments, molten material 121 may be gravity fed from the mixing chamber 131 to the delivery vessel 133 by way of the third connecting conduit 137. For instance, gravity may drive the molten material 121 to pass through an interior pathway of the third connecting conduit 137 from the mixing chamber 131 to the delivery vessel 133.

As further illustrated, a delivery pipe 139 can be positioned to deliver molten material 121 to the inlet conduit 141. The molten material 121 is then delivered from the inlet conduit 141 to be received by a trough 147 of a forming vessel 140. The forming vessel 140 may draw the molten material 121 into the glass ribbon 103. For example, as shown, the molten material 121 may be drawn off a root 142 of the forming vessel 140 along draw direction 211 of the glass manufacturing apparatus 101. A width "W" of the glass ribbon 103 can extend between the first vertical edge 153 of the glass ribbon 103 and the second vertical edge 155 of the glass ribbon 103.

Figure 2:
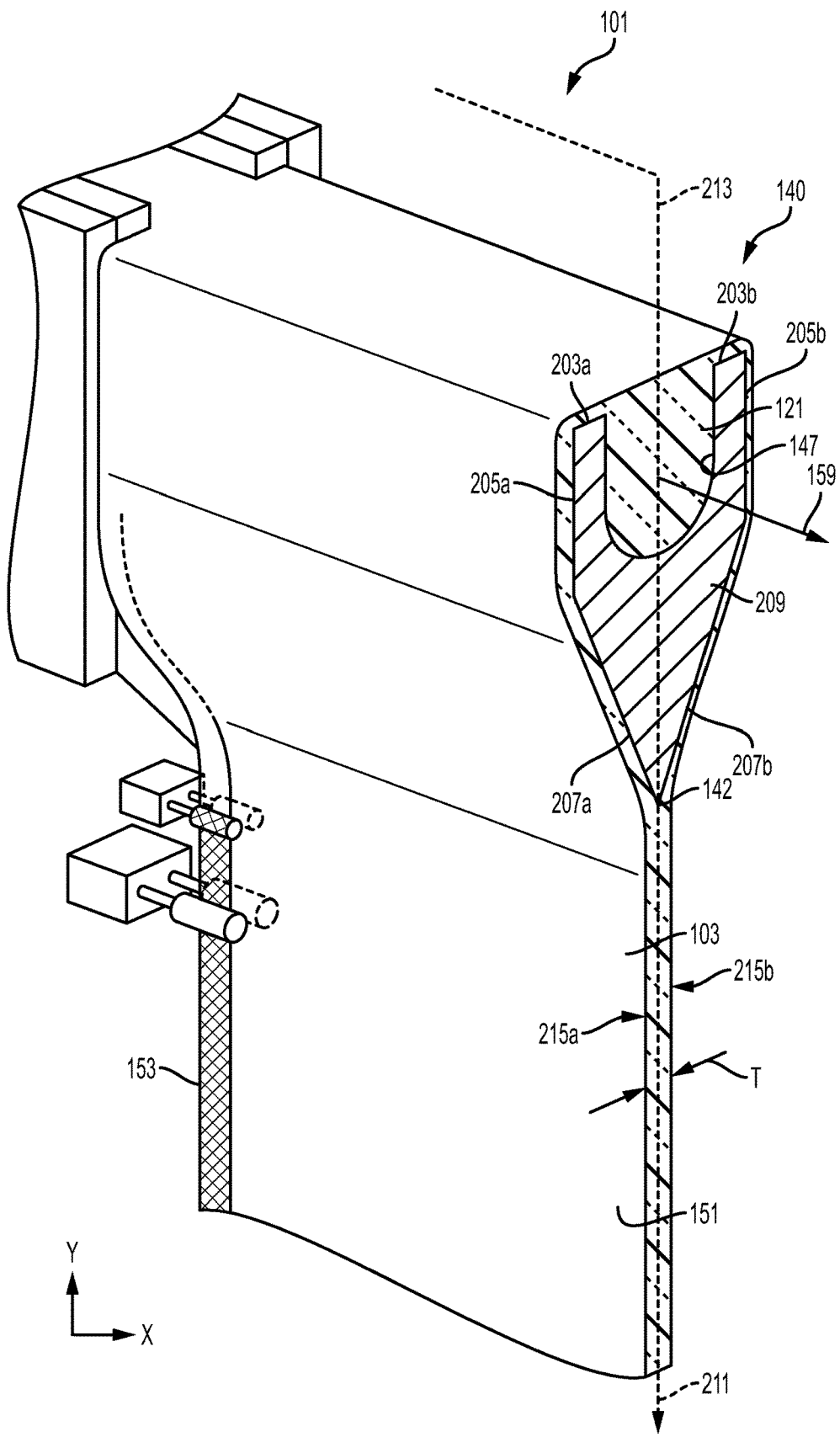
FIG. 2 illustrates a sectional view of the glass manufacturing apparatus taken along line 2-2 of FIG. 1.

FIG. 2 is a cross-sectional perspective view of the glass manufacturing apparatus 101 along line 2-2 of FIG. 1. As shown, the forming vessel 140 can include the trough 147 oriented to receive the molten material 121 from the inlet conduit 141. The forming vessel 140 can further include a forming wedge 209 including a pair of downwardly inclined converging surface portions 207a, 207b extending between opposed ends of the forming wedge 209. The pair of downwardly inclined converging surface portions 207a, 207b of the forming wedge 209 converge along the draw direction 211 to intersect along a bottom edge to define the root 142. A draw plane 213 of the glass manufacturing apparatus 101 extends through the root 142 wherein the glass ribbon 103 may be drawn in the draw direction 211 along the draw plane 213. As shown, the draw plane 213 can bisect the root 142 although the draw plane 213 may extend at other orientations relative to the root 142.

Referring to FIG. 2, in one embodiment, the molten material 121 can flow in a direction 159 into the trough 147 of the forming vessel 140. The molten material 121 can then overflow from the trough 147 by simultaneously flowing over corresponding weirs 203a, 203b and downward over the outer surfaces 205a, 205b of the corresponding weirs 203a, 203b. Respective streams of molten material 121 then flow along the downwardly inclined converging surface portions 207a, 207b of the forming wedge 209 to be drawn off the root 142 of the forming vessel 140, where the flows converge and fuse into the glass ribbon 103. The glass ribbon 103 may then be fusion drawn off the root 142 in the draw plane 213 along draw direction 211 where, in some embodiments, the glass sheet 104 (see FIG. 1) may then be subsequently separated from the glass ribbon 103.

As shown in FIG. 2, the glass ribbon 103 may be drawn from the root 142 with a first major surface 215a of the glass ribbon 103 and a second major surface 215b of the glass ribbon 103 facing opposite directions and defining a thickness "T" of the glass ribbon 103 that can, for example, be less than or equal to about 2 millimeters (mm), less than or equal to about 1 millimeter, less than or equal to about 0.5 millimeters, less than or equal to about 500 micrometers (μm), such as less than or equal to about 300 micrometers, such as less than or equal to about 200 micrometers, or such as less than or equal to about 100 micrometers, although other thicknesses may be provided in further embodiments. In addition, the glass ribbon 103 can include a variety of compositions including but not limited to soda-lime glass, borosilicate glass, alumino-borosilicate glass, an alkali-containing glass, or an alkali-free glass.

Features of example glass separation apparatus 101b, 1001b will now be described. The described embodiments are disclosed as exemplary and are not meant to limit the present disclosure. Furthermore, the glass separation apparatus 101b, 1001b and methods described hereinafter refer generally to separating a glass sheet from a glass ribbon, but it will be apparent to one skilled in the art that the apparatus and method can be used for other purposes, including but not limited to separating the glass ribbon that may be coiled on a spool from the portion of the glass ribbon being formed, separating a glass sheet from a glass ribbon being uncoiled from a spool of previously-formed glass ribbon, separating a glass sheet from another glass sheet and separating edge beads from a glass sheet or a glass ribbon.

Figure 3:
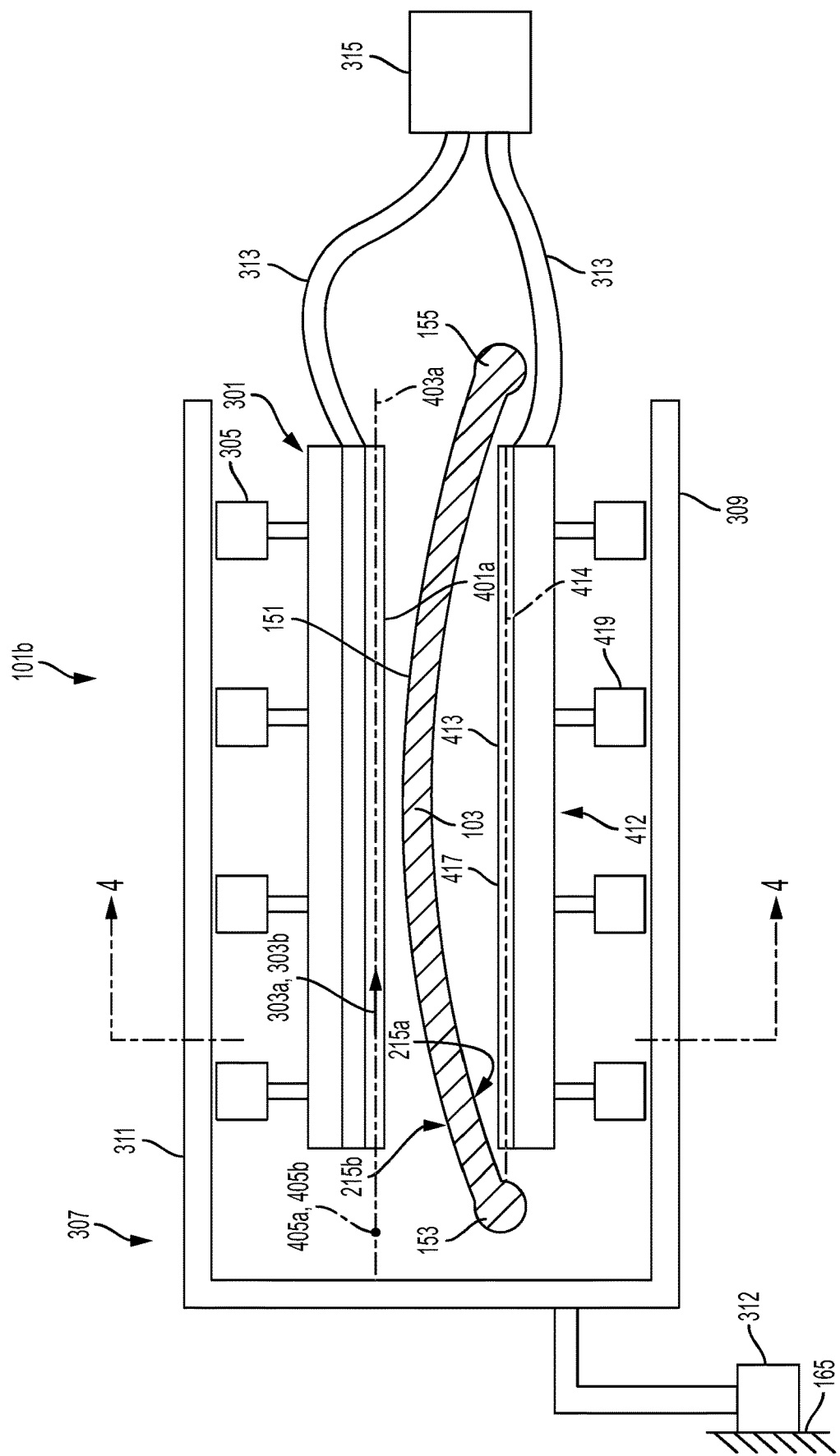
FIG. 3 illustrates a sectional view of a first embodiment of the glass manufacturing apparatus taken along line 3-3 of FIG. 1.
Figure 4:
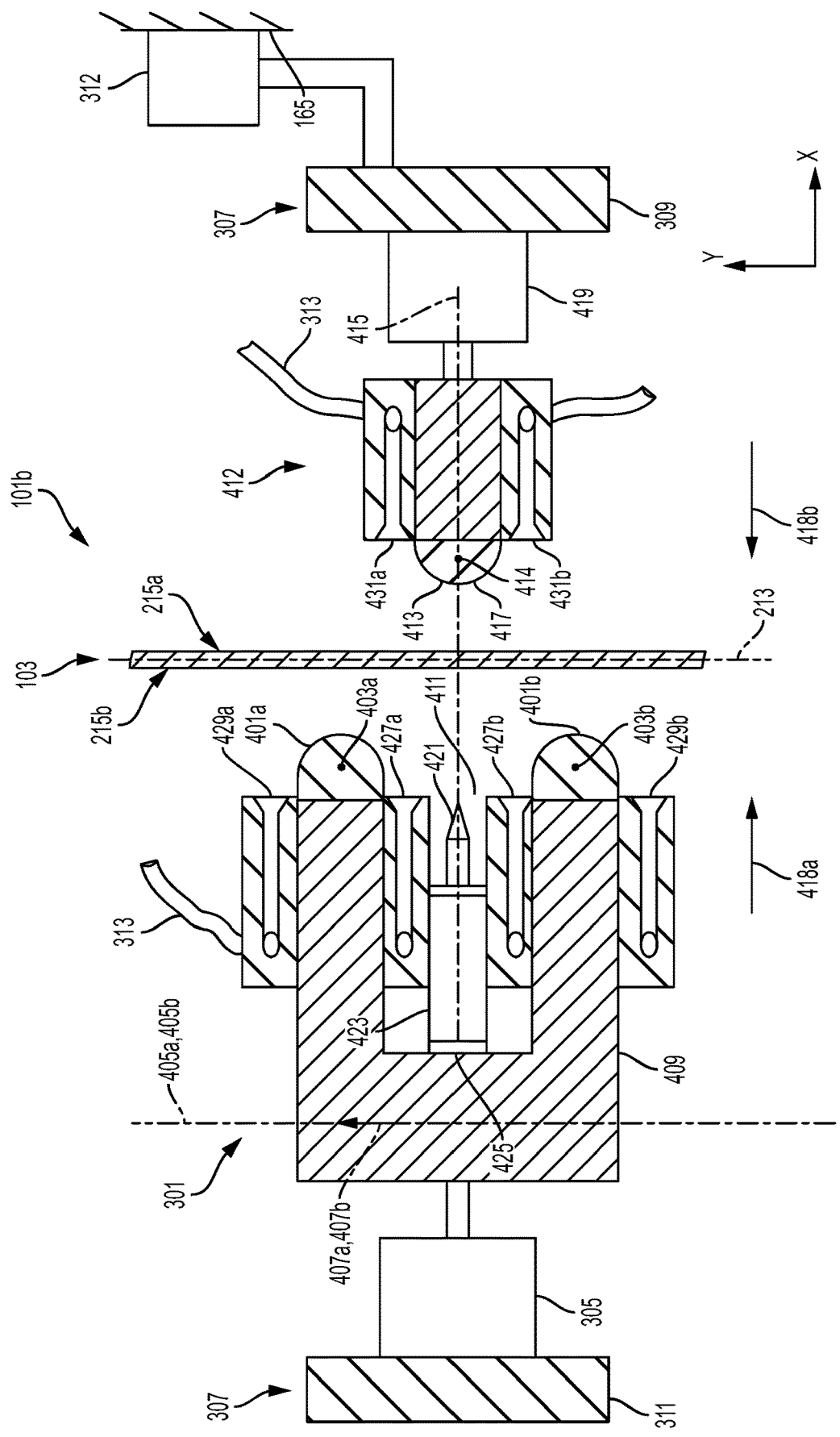
FIG. 4 is a sectional view of a glass separation apparatus taken along line 4-4 of FIG. 3.

FIGS. 3-9 illustrate example embodiments of the glass separation apparatus 101b that can include an engagement device 301. As shown in FIG. 4, the engagement device can include a first elongated member 401a extending along a first elongated axis 403a and a second elongated member 401b extending along a second elongated axis 403b. In some embodiments, the first elongated axis 403a and the second elongated axis 403b can be straight and parallel to one another and extend along a common direction 303a, 303b (see FIG. 3) although other configurations may be possible in further embodiments. In alternative embodiments, although not shown, the direction 303a of the first elongated axis 403a may extend at a nonzero angle relative to the direction 303b of the second elongated axis 403b.

The first elongated member 401a can be rotatable about a first rotation axis 405a extending along a direction 407a at a first nonzero angle (e.g., 90°) relative to the direction 303a of the first elongated axis 403a. Likewise, the second elongated member 401b can be rotatable about a second rotation axis 405b extending along a direction 407b at a second nonzero angle (e.g., 90°) relative to the direction 303b of the second elongated axis 403b. As shown, in some embodiments, the first elongated member 401a can be rigidly coupled relative to the second elongated member 401b such that both the first and second elongated members 401a, 401b rotate respective axes 405a, 405b that are coincident with one another and extend in the same direction 407a, 407b. As shown, the first and second elongated members 401a, 401b can be mounted to a common base 409 such that a rotation of the common base 409 about the rotation axes 405a, 405b results in simultaneous rotation of the first and second elongated members 401a, 401b about the rotation axes 405a, 405b. As can be appreciated by FIGS. 3 and 4, in some embodiments, a common plane extends along the direction 303a of the first elongated axis 403a, the direction 303b of the second elongated axis 403b, the direction 407a of the first rotation axis 405a and the direction 407b of the second rotation axis 405b. Such a configuration can allow proper engagement of the first and second elongated members 401a, 401b with the second major surface 215b of the glass ribbon 103 as the first and second elongated members 401a, 401b rotate about the rotation axes 405a, 405b.

Although not shown, the first and second elongated members 401a, 401b may be designed to be rotated about axes that are not coincident with one another. In some embodiments, the rotation axes 405a, 405b may be spaced from one another rather than coincident with one another as shown. In addition or alternatively, the rotation axis 405a, 405b may be positioned at an angle relative to one another wherein the direction 407a of the first rotation axis 405a extends at a nonzero angle relative to the direction 407b of the second rotation axis 405b.

Whether or not coincident with one another, the rotation axes 405a, 405b may remain stationary during rotation of the corresponding first and second elongated members 401a, 401b. In some embodiments, one or more actuators 305 may rotate the first and second elongated members 401a, 401b about the respective rotation axes 405a, 405b such that the position of the axes, as shown for example in FIG. 3 does not change. In some embodiments, the first and second elongated members 401a, 401b may pivot about fixed pivot axes comprising the stationary rotation axes 405a, 405b. Alternatively, the rotation axes 405a, 405b may move during rotation of the first and second elongated members 401a, 401b. In such embodiments, the first and second elongated members 401a, 401b rotate about an axis that moves during the process of rotating the first and second elongated members 401a, 401b. The first and second elongated members 401a, 401b may comprise a wide range of materials such as metal (e.g., aluminum, stainless steel), elastomeric material (e.g., rubber), ceramic material, resin material or other materials depending on the particular application.

As shown in FIG. 4, in some embodiments, the second elongated member 401b is spaced from the first elongated member 401a. In such an orientation, a space 411 is disposed between the first elongated member 401a and the second elongated member 401b. As further shown in FIG. 4, the glass separation apparatus 101b can further include an anvil device 412 including an elongated anvil member 413. The elongated anvil member 413 can extend along an elongated axis 414 that can be aligned with the space 411 disposed between the first elongated member 401a and the second elongated member 401b. As shown in FIG. 4, the elongated anvil member 413 can be vertically aligned, along the draw plane 213 of the glass manufacturing apparatus 101, relative to the space 411. Once aligned, a contact plane 415 of the elongated anvil member 413 can extend through the space 411 and, in some embodiments, may bisect the space 411. In such embodiments, the contact plane 415 can be considered the axis extending through a point 417 of the elongated anvil member 413 closest to the draw plane 213 and perpendicular to the draw plane 213 of the glass manufacturing apparatus 101. In some embodiments, as shown in FIG. 4, the contact plane 415 can be oriented along a horizontal plane that is perpendicular to gravity and includes the illustrated "X-direction".

Figure 8:
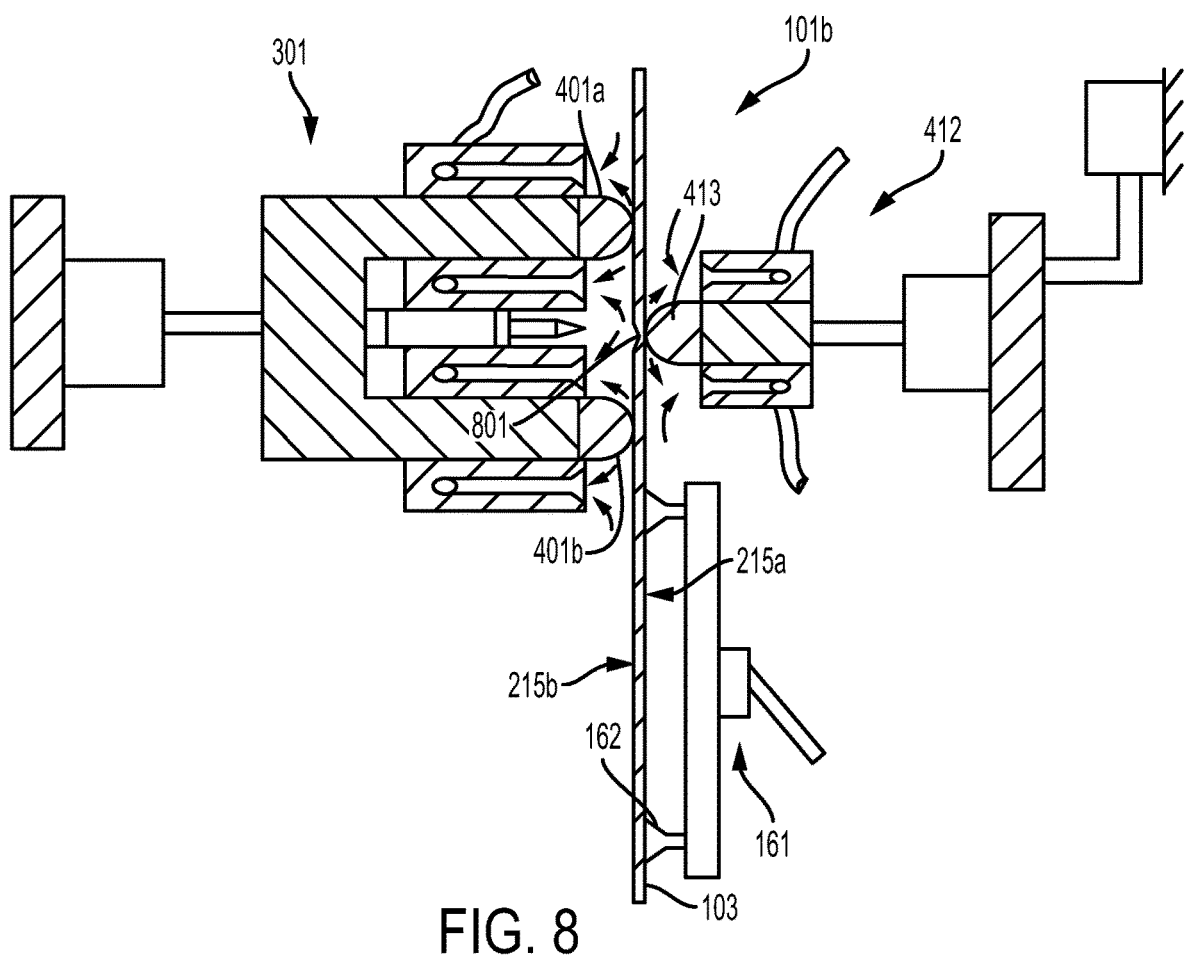
FIG. 8 illustrates a sectional view of the glass separation apparatus after scoring.

At least one of the engagement device 301 and the elongated anvil member 413 may be movable relative to the other of the engagement device 301 and the elongated anvil member 413. For example, referring to FIG. 4, the actuators 305 may move the engagement device 301 in a direction 418a towards the elongated anvil member 413 and the second major surface 215b of the glass ribbon 103. In addition or alternatively, one or more actuators 419 may move the elongated anvil member 413 in a direction 418b towards engagement device 301 and the first major surface 215a of the glass ribbon 103. As shown in FIG. 4, the direction 418a can be opposite the direction 418b. As illustrated in FIG. 8, relative movement between the engagement device 301 and the elongated anvil member 413 can eventually result in engagement of the first and second elongated member 401a, 401b with the second major surface 215b of the glass ribbon 103 and engagement of the elongated anvil member 413 with the first major surface 215a of the glass ribbon 103.

Referring back to FIG. 3, in some embodiments, the engagement device 301 and the elongated anvil member 413 are mounted on a carriage 307. As shown, in one embodiment, the elongated anvil member 413 of the anvil device 412 can be mounted to a first portion 309 of the carriage 307 by way of the actuators 419. Furthermore, in the illustrated embodiment, the engagement device 301 can be mounted to a second portion 311 of the carriage 307 by way of the actuators 305. Mounting both the engagement device 301 and the elongated anvil member 413 to the same carriage 307 can allow simultaneous movement of the anvil device 412 and the engagement device 301; thereby avoiding errors in alignment between the anvil device 412 and the engagement device 301 that may otherwise occur if the anvil device 412 and the engagement device 301 are not mounted on the same carrier. Furthermore, as discussed below, separation of the glass sheet from the glass ribbon along a score line can be achieved by relative movement between the anvil device 412 and the engagement device 301 that are both mounted to the same carriage 307. An actuator 312 can move the carriage in the travel direction (e.g., draw direction 211) at a speed that matches a speed of the glass ribbon 103 traveling in the travel direction. As both the anvil device 412 and the engagement device 301 are mounted on the same carriage 307 and move together with the same carriage 307, force spikes can be minimized when compared to conventional designs that pivot the lower portion of the glass ribbon about the score line with a gripping head 161 (see FIG. 1) of a glass sheet handling device 163 that may be supported directly or indirectly by the ground 165 rather than a carriage.

As shown in FIG. 4, the glass manufacturing apparatus 101 may further include a scoring element 421 that can be moveable in direction 418a toward the elongated anvil member 413. In some embodiments, as shown, the scoring element 421 can be moved within the space 411 disposed between the first elongated member 401a and the second elongated member 401b. In some embodiments, the scoring element 421 can comprise a pointed scribe, a score wheel, or a laser device. The glass manufacturing apparatus 101 can include an actuator 423 that can move the scoring element 421 between the retracted position shown in FIG. 4 to an extended position shown in FIG. 7. In further embodiments, the scoring element 421 may be mounted relative to a track 425 wherein the scoring element 421 may move in a direction 303a, 303b of the first and second elongated axes 403a, 403b during a scoring movement of the scoring element 421.

In further embodiments, at least one of the engagement device 301 and the elongated anvil member 413 may be provided with a vacuum port. For instance, as shown in FIG. 4, the engagement device 301 may be provided with one or more inner vacuum ports 427a, 427b disposed vertically between the first and second elongated members 401a, 401b. Such inner vacuum ports 427a, 427b, if provided, can help remove debris from the vicinity of the space 411 during a scoring operation and/or a separation operation. In addition or alternatively, the engagement device 301 may be provided with one or more outer vacuum ports 429a, 429b disposed outside a respective first and second elongated member 401a, 401b to remove debris that may escape the vicinity of the space 411 during the scoring operation and/or a separation operation.

As further shown in FIG. 4 the elongated anvil member 413 may also be provided with one or more vacuum ports 431a, 431b that can help remove debris during the separation operation. As shown in FIG. 3, conduits 313 may place the vacuum ports 427a-b, 429a-b, 431a-b in communication with a vacuum source 315.

Figure 7:
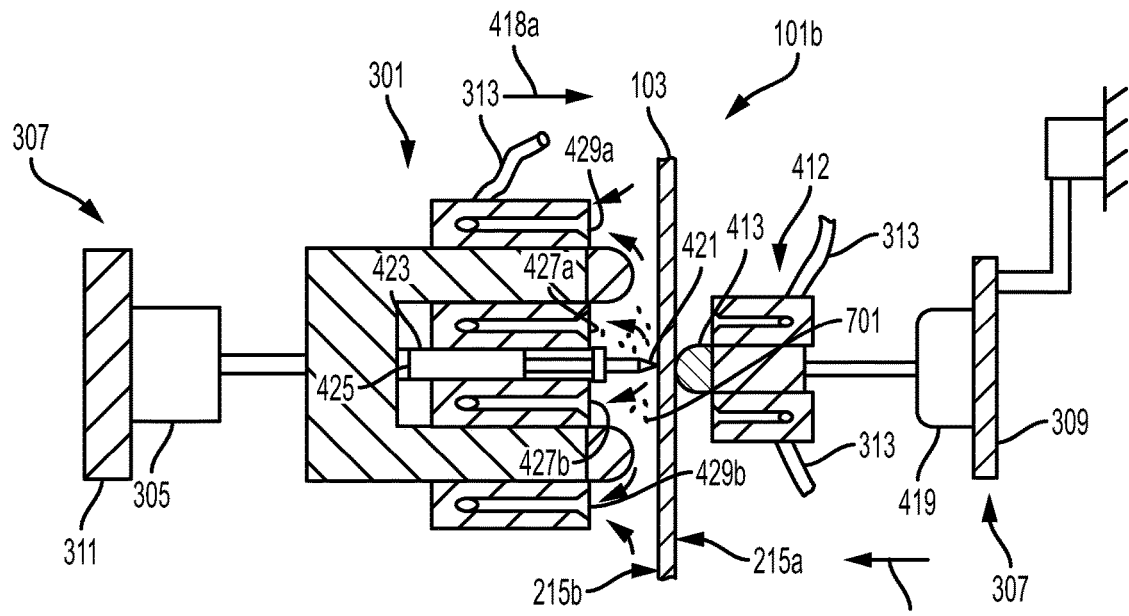
FIG. 7 is a sectional view of the glass separation apparatus taken at line 7-7 of FIG. 6, illustrating scoring of the glass ribbon.

Example methods of separating the glass ribbon 103 with the glass separation apparatus 101b will now be described. As shown in FIG. 7, the method can include contacting the first major surface 215a of the glass ribbon 103 with the elongated anvil member 413. In some embodiments, the actuator(s) 419 may cause the anvil device 412 with the elongated anvil member 413 to move in direction 418b to engage the first major surface 215a of the glass ribbon 103.

As shown in FIG. 5, the method can further include contacting a portion 501 of the second major surface 215b of the glass ribbon 103 with the first elongated member 401a and the second elongated member 401b. For example, the actuators 305 can move at least a portion of the first and second elongated member 401a, 401b in direction 418a such that the first and second elongated member 401a, 401b contact the portion 501 of the second major surface 215b. As shown in FIG. 5, at the point of initial contact, the direction 303a, 303b of the corresponding first and second elongated axis 403a, 403b can be positioned at a contact angle 503 relative to a direction 416 of the elongated axis 414 of the elongated anvil member 413. In some embodiments, the contact angle 503 can be within a range of from greater than 0° to 60°, such as from greater than 0° to 45°, such as greater than 0° to 30° although other initial contact angles may be provided in further embodiments.

As shown in FIGS. 5 and 6, the method can further include rotating the first elongated member 401a about the first rotation axis 405a and the second elongated member 401b about the second rotation axis 405b to reduce the contact angle 503 while at least partially flattening the glass ribbon 103 against the elongated anvil member 413 such that, as shown, the first outer edge 153 and the second outer edge 155 of the glass ribbon 103 begin spreading apart while the elongated anvil member 413 contacts the first major surface 215a of the glass ribbon 103. In some embodiments, the first and second elongated member 401a, 401b press against the second major surface 215b of the glass ribbon 103 to facilitate at least partial flattening of the glass ribbon 103 wherein, as further shown in FIGS. 5 and 6, at least a portion of scoring of the second major surface 215b of the glass ribbon 103 is conducted while partially but not entirely spreading apart the first outer edge 153 and the second outer edge 155. In such embodiments, reducing the contact angle 503 can start flattening the glass ribbon 103 at the side of the glass ribbon 103 where scoring begins, thereby enhancing the scoring function by reducing the time necessary to produce the score line and by reducing excessive interaction between the scoring element and the glass ribbon 103 that may occur when pressing the portion of the glass ribbon against the elongated anvil member 413 with the scoring element.

Rotation and movement of the first and second elongated members 401a, 401b can continue until the contact angle 503 is reduced to about 0° and can further include engagement of the entire length of the first and second elongated members 401a, 401b with the second major surface 215b of the glass ribbon 103 while the entire length of the elongated anvil member 413 contacts the first major surface 215a as shown in FIG. 8. In such a position where the contact angle 503 is reduced to about 0°, the glass ribbon 103 can be held in a substantially flat orientation along the score line 801. The substantially flat orientation of the glass ribbon 103 along the score line 801 can occur at the time that the contact angle 503 is reduced to about 0°. Alternatively, the glass ribbon can be partially flattened when the contact angle 503 reaches about 0° and then the glass ribbon 103 can be entirely flattened along the score line 801, for example, while nonrotatably translating the first and second elongated members 401a, 401b in the direction 418a toward the elongated anvil member 413.

While at least partially flattening the glass ribbon 103 or after entirely flattening the glass ribbon 103 along the score line 801, the method can further include scoring the second major surface 215b of the glass ribbon 103 to produce a score line 801 (see FIG. 8) within the second major surface 215b of the glass ribbon 103 along a separation path aligned with the elongated anvil member 413. Scoring of the second major surface 215b can be conducted while at least partially flattening the glass ribbon 103 and during rotation of the first elongated member 401a about the first rotation axis 405a and the second elongated member 401b about the second rotation axis 405b. In one embodiment, as can be appreciated by FIGS. 5-7, the outer edge of the first and second elongated members 401a, 401b may engage the portion 501 of the second major surface 215b and pinch the glass ribbon at that location between the first and second elongated members 401a, 401b and the elongated anvil member 413. As shown, the location of the portion 501 can be offset inward from the relatively thick first edge 153 of the glass ribbon 103. As shown in FIG. 7, the scoring element 421 can be moved in direction 418a toward the elongated anvil member 413 by the actuator 423. As such, in some embodiments, the scoring element 421 may be pressed against the second major surface 215b to produce the score line 801 while elongated anvil member 413 applies a force against the first major surface 215a to counteract the force applied by the scoring element 421.

An actuator (not shown) can cause the scoring element 421 to move along the track 425 such that the scoring element 421 moves in direction 601 (see FIG. 6) relative to the first and second elongated members 401a, 401b to continue producing the score line 801 along the elongated anvil member 413. As can be appreciated by FIGS. 5 and 6, in some embodiments, the first and second elongated members 401a, 401b partially flatten the glass ribbon 103 against the elongated anvil member 413 and then the scoring element 421 entirely flattens the glass ribbon 103 against the elongated anvil member 413 at the location where the glass ribbon is being scored. Thus, in some embodiments, at least a portion of scoring of the second major surface 215b of the glass ribbon 103 may be conducted while at least partially flattening the glass ribbon 103 against the elongated anvil member 413.

As shown, in some embodiments, the method can include vacuuming debris while scoring the second major surface 215b of the glass ribbon 103. As shown in FIG. 7, debris 701 may be vacuumed by inner vacuum ports 427a-b and/or outer vacuum ports 429a-b where vacuum source 315 (see FIG. 3) can promote air flow that is entrained with the debris 701, collected by the vacuum ports and transported by the conduits 313 away from the glass ribbon 103. Vacuuming debris can be provided in some embodiments to help maintain the pristine surfaces of the glass ribbon 103 by preventing contamination of the surfaces that may occur upon transfer of glass particles, particles from the scoring element, or other debris generated during scoring from being transferred to the pristine glass surfaces of the glass ribbon 103.

After the scoring element 421 passes over the scored portion of the glass ribbon, the first and second elongated members 401a, 401b can help maintain the at least partially collapsed orientation of the glass ribbon 103; thereby helping prevent the glass ribbon 103 from biasing fully back to its original bowed configuration (shown in FIG. 3).

After the process of scoring, in some embodiments, the scoring element 421 may be retracted back to the position shown in FIG. 8 and the glass ribbon 103 may be trapped horizontally by engagement of the first and second elongate members 401a, 401b with the second major surface 215b of the glass ribbon 103 and the engagement of the elongated anvil member 413 with the first major surface 215a of the glass ribbon 103. As shown in FIG. 8, the glass ribbon 103 can be completely flattened against the elongated anvil member 413 along the score line 801 that is aligned with the elongated anvil member 413.

Figure 9:
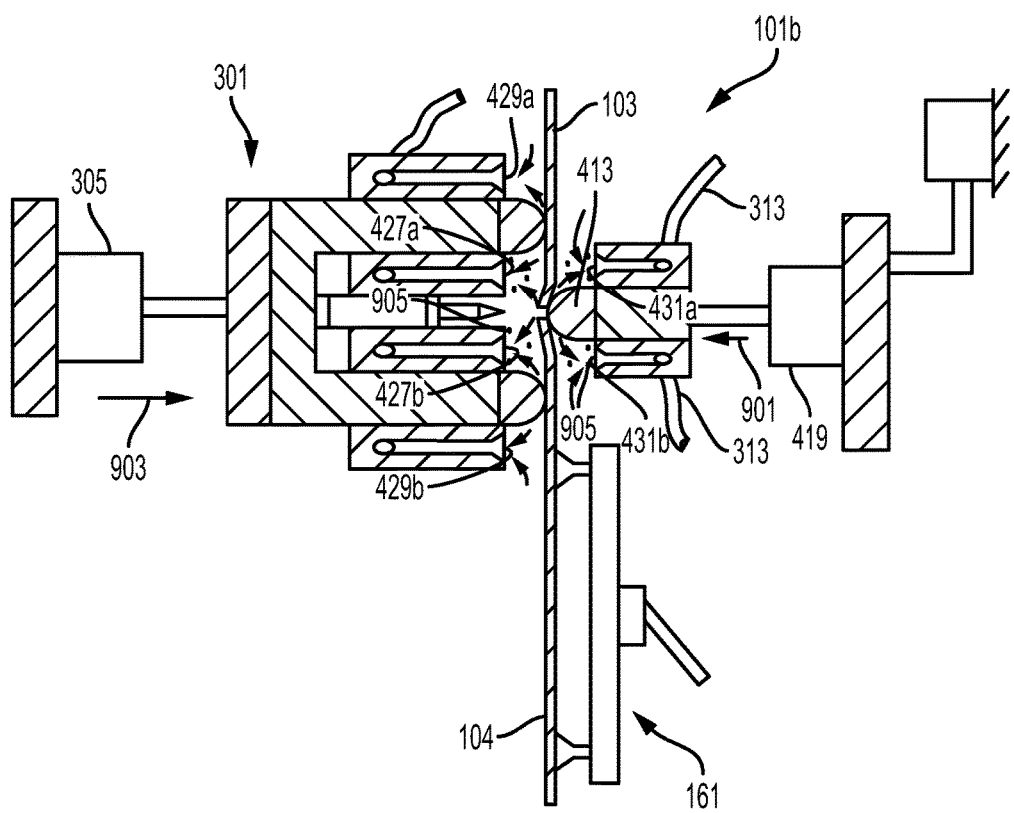
FIG. 9 illustrates separation of the glass ribbon by moving at least one of the engagement device and the elongated anvil member relative to the other.
Figure 10:
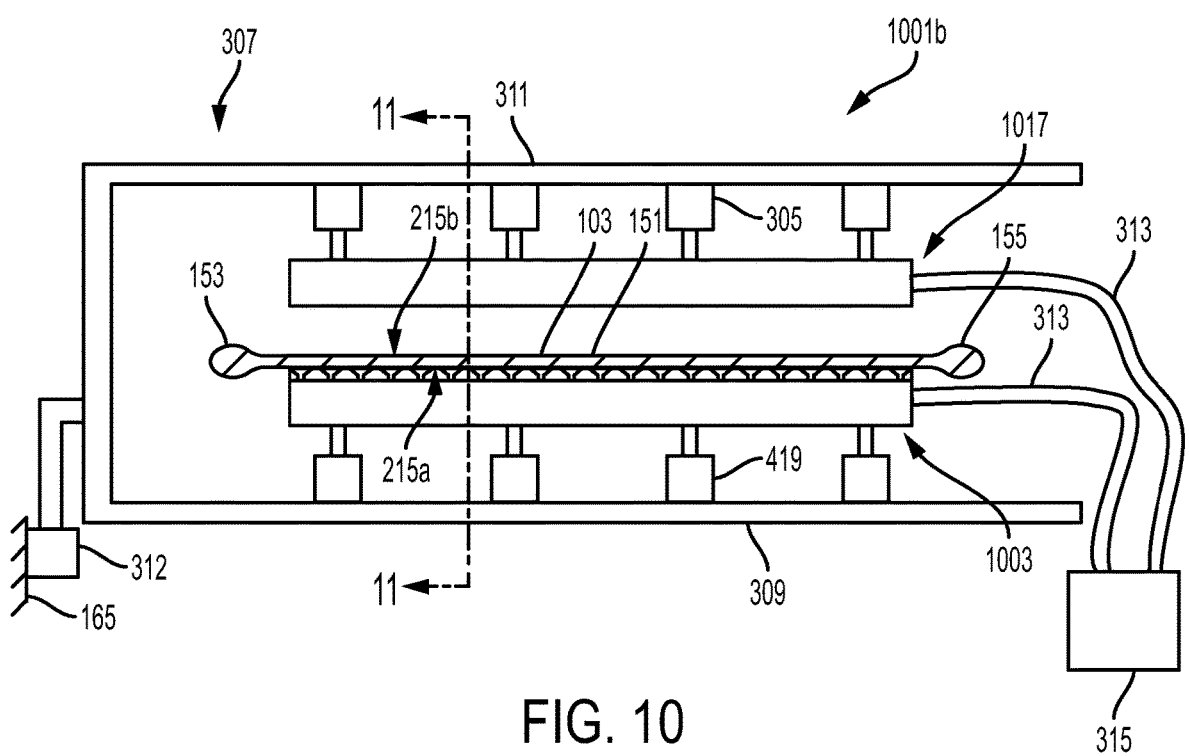
FIG. 10 illustrates a sectional view of a second embodiment of the glass manufacturing apparatus taken along line 3-3 of FIG. 1.

FIG. 9 illustrates separating the glass ribbon 103 along the score line 801 by moving at least one of the engagement device 301 and the elongated anvil member 413 relative to the other of the engagement device and the elongated anvil member. As shown in FIG. 8, to prevent dropping of the glass sheet upon separation, in some embodiments, the gripping head 161 of the glass sheet handling device 163 may be removably attached to the glass ribbon 103 below the score line 801. In some embodiments, the gripping head 161 may include suction cups 162 or other devices that contact the glass ribbon 103 toward the outer edges considered non-quality areas that will be subsequently removed together with the enlarged beads at the first edge 153 and second edge 155 of the glass ribbon 103. In one embodiment, as shown in FIG. 9, the elongated anvil member 413 may be moved in direction 901 by the actuator(s) 419 wherein the glass sheet 104 may be entirely separated from the glass ribbon 103 along the score line 801 and supported by the gripping head 161 of the glass sheet handling device 163. In another embodiment, the actuator(s) 305 may move the engagement device 301 in direction 903 wherein the glass sheet 104 may likewise be entirely separated from the glass ribbon 103 along the score line 801.

As shown, in some embodiments, the method can include vacuuming debris while separating the glass sheet 104 from the glass ribbon 103. As shown in FIG. 9, debris 905 may be vacuumed by inner vacuum ports 427a-b, outer vacuum ports 429a-b, and/or 431a, 431b where vacuum source 315 (see FIG. 3) can promote air flow that is entrained with the debris 905, collected by the vacuum ports and transported by the conduits 313 away from the glass ribbon 103. Vacuuming debris can be provided to help maintain the pristine surfaces of the glass ribbon 103 by preventing contamination of the surfaces of the glass sheet 104 and/or glass ribbon 103 that may be generated when separating the glass sheet 104 from the glass ribbon surfaces of the glass ribbon 103.

Figure 11:
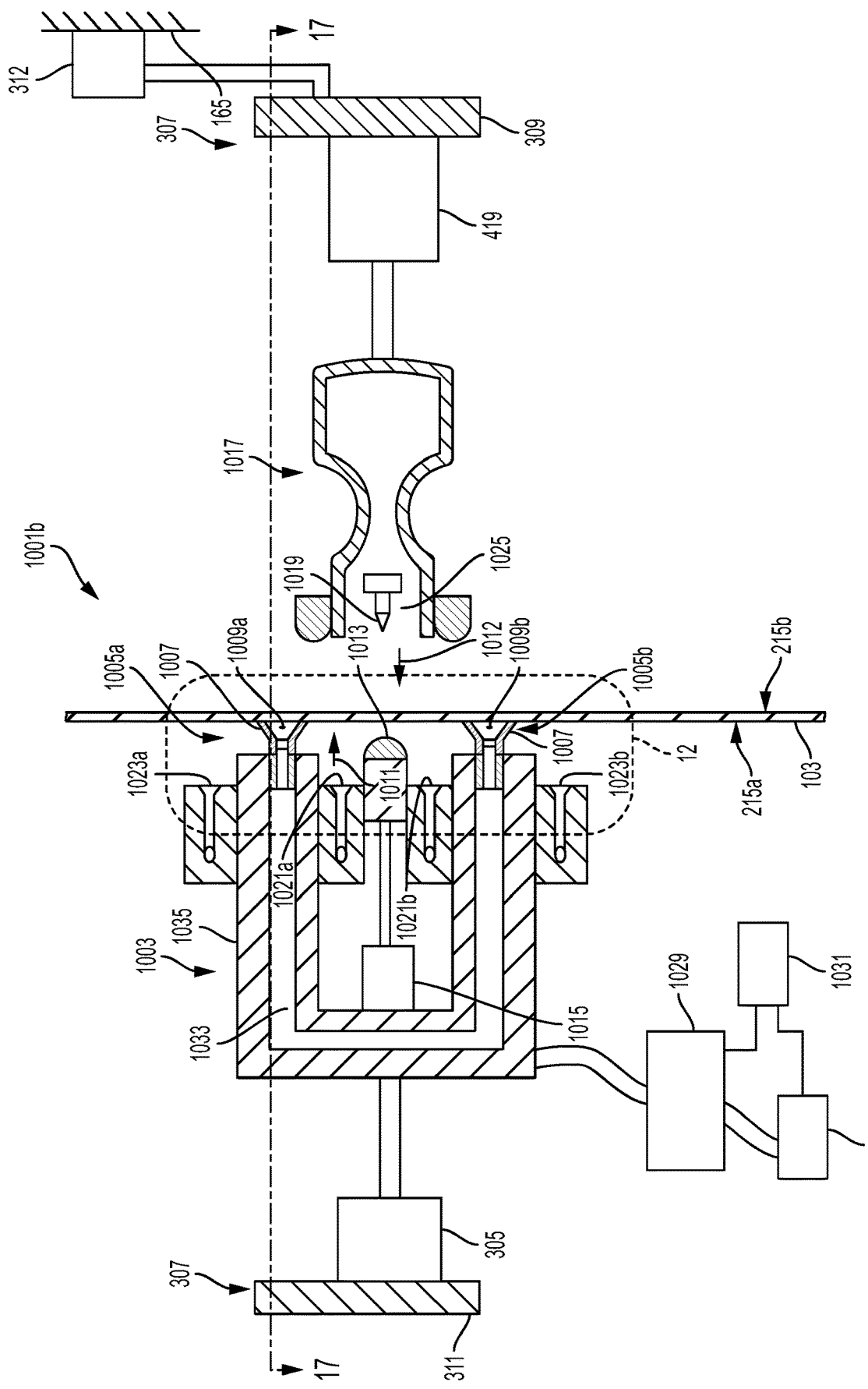
FIG. 11 is a sectional view of the second embodiment of glass separation apparatus along line 11-11 of FIG. 10.

FIGS. 10-17 illustrate additional example embodiments of a glass separation apparatus 1001b of the glass manufacturing apparatus 101. The glass separation apparatus 1001b can include an engagement device 1003 that, as shown in FIG. 11, can include a first row 1005a of suction cups 1007 extending along a first elongated axis 1009a. The glass separation apparatus 1001b can also include a second row 1005b of suction cups 1007 extending along a second elongated axis 1009b. Each suction cup 1007 of the first and second row 1005a, 1005b of suction cups 1007 faces a first direction 1011. In some embodiments, as shown, the first direction 1011 can be perpendicular to first major surface 215a of the glass ribbon 103 and/or the draw plane 213. As shown, each suction cup 1007 can flare outwardly in the first direction 1011 to a distal circumferential end designed to initially engage the first major surface 215a of the glass ribbon 103 when attaching the suction cups 1007 to the first major surface 215a of the glass ribbon 103. The suction cups 1007 can comprise a resilient material such as rubber although nonresilient materials may be provided in further embodiments.

As shown, the first and second elongated axis 1009a, 1009b can each be a linear axis although non-linear axes may be provided in further embodiments. Furthermore, as shown, the first elongated axis 1009a can be parallel to the second elongated axis 1009b although non-parallel configurations may be provided in further embodiments. Still further, as shown, each suction cup 1007 of the suction cups of each row 1005a, 1005b of suction cups 1007 can be spaced apart (e.g., equally spaced apart) in series along a linear axis at the same elevation. Providing the row of suction cups along a linear axis at the same elevation can minimize the vertical contact area of the glass ribbon; thereby minimizing damage along the length of the separated glass sheet 104 due to contact between the suction cups and the glass ribbon 103. Alternatively, the suction cups of one or both rows 1005a, 1005b of suction cups 1007 may comprise a row of suction cups that are staggered vertically along the respective first and second elongated axis 1009a, 1009b. Providing a staggered orientation may be provided in applications where there is a desire for increased rigidity and reduced bending at the location where the suction cups are attached to the glass ribbon 103.

As shown in FIG. 11, each suction cup 1007 of the first row 1005a of suction cups 1007 can be located vertically above an elongated anvil member 1013 at a higher elevation than the elongated anvil member 1013 and each suction cup 1007 of the second row 1005b of suction cups 1007 can be located vertically below the elongated anvil member 1013 at a lower elevation than the elongated anvil member 1013. Furthermore, as shown in FIG. 11, the elongated anvil member 1013 can be disposed vertically between the first and second row 1005a, 1005b of suction cups 1007. Such positioning of the rows of suction cups 1007 can help securely hold the glass ribbon 103 against the elongated anvil member 1013 and/or pull the glass ribbon 103 against the elongated anvil member 1013 during the process of scoring and/or separating the glass ribbon 103.

In some embodiments, unless otherwise noted, the elongated anvil member 1013 of the glass separation apparatus 1001b may be similar or identical to the elongated anvil member 413 of the glass separation apparatus 101b. As shown in FIG. 11, the elongated anvil member 1013 can face the first direction 1011. Thus, the suction cups 1007 and the elongated anvil member 1013 can both face the first direction 1011 to simultaneously engage the first major surface 215a of the glass ribbon 103 during the process of scoring and separating the glass sheet 104 from the glass ribbon 103.

In some embodiments, at least one of the engagement device 1003 and the elongated anvil member 1013 can be movable relative to the other of the engagement device 1003 and the elongated anvil member 1013. In one embodiment, the engagement device 1003 can include an actuator 1015 to move the elongated anvil member 1013 in the first direction 1011 relative to the suction cups 1007 to engage the elongated anvil member 1013 with the first major surface 215a of the glass ribbon 103. Alternatively, the actuator 1015 can move the elongated anvil member 1013 in a second direction 1012, opposite the first direction 1011, to retract the elongated anvil member 1013 out of engagement with the first major surface 215a of the glass ribbon 103.

Figure 14:
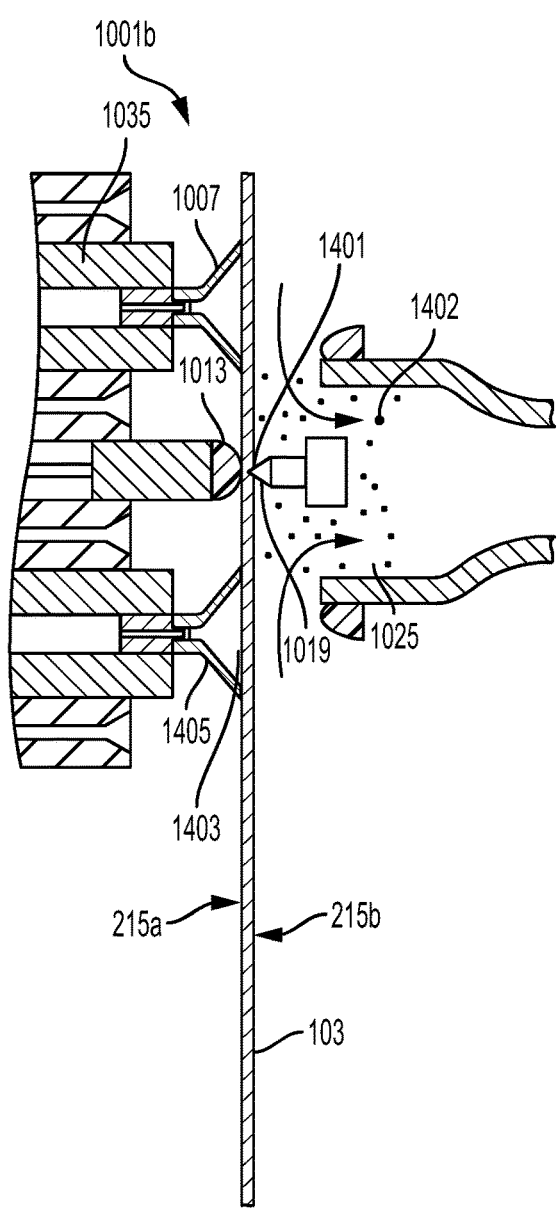
FIG. 14 is an enlarged view of the second embodiment of the glass separation apparatus similar to FIG. 13 but illustrating producing a score line in a second major surface of the glass ribbon.

As shown in FIG. 11, the glass separation apparatus 1001b can include a scoring device 1017 including a scoring element 1019. Unless stated otherwise, the scoring element 1019 of the scoring device 1017 can be similar or identical to the scoring element 421 of the engagement device 301. As schematically shown in FIGS. 11 and 14, the scoring element 1019 can be moved in the second direction 1012 toward the elongated anvil member 1013 such that the scoring element 1019 engaged and scores the second major surface 215b of the glass ribbon 103.

Figure 15:
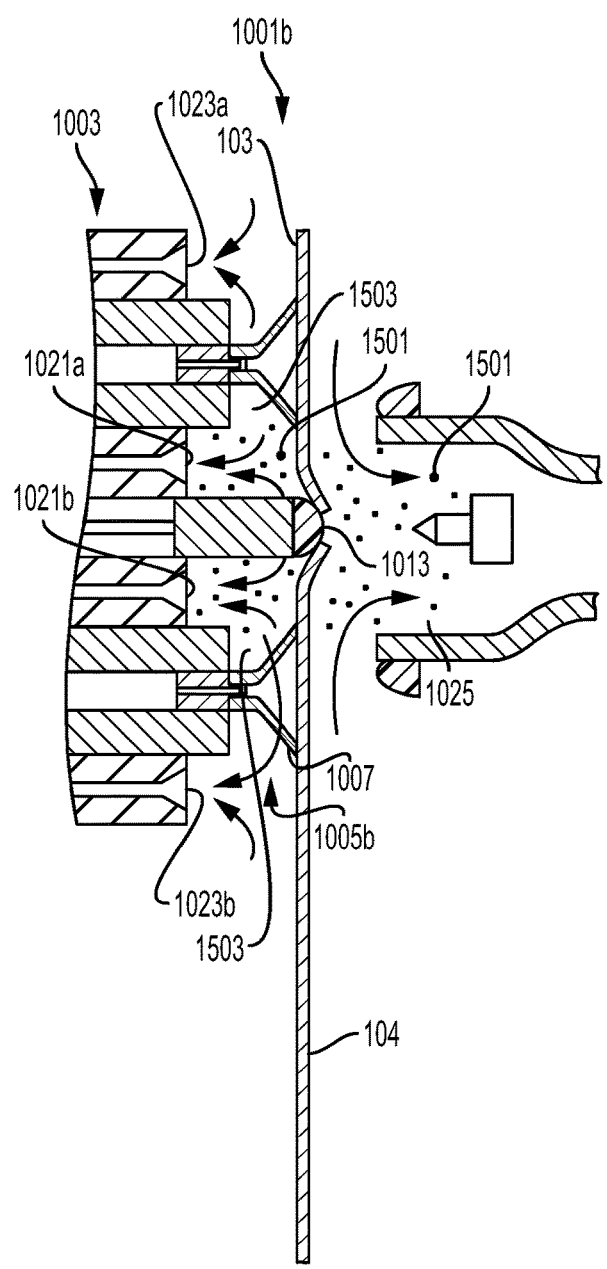
FIG. 15 is an enlarged view of the second embodiment of the glass separation apparatus similar to FIG. 14 but illustrating further extending the elongated anvil member to separate the glass ribbon along the score line.

At least the elongated anvil member 1013 may be provided with at least one vacuum port configured to remove debris while the suction cups 1007 of the first and second row 1005a, 1005b of suction cups 1007 are each attached to a major surface of a glass ribbon 103. For instance, as shown in FIG. 11, the elongated anvil member 1013 may be provided with one or more inner vacuum ports 1021a, 1021b disposed vertically between the first and second row 1005a, 1005b of suction cups 1007. As shown in FIG. 15, such inner vacuum ports 1021a, 1021b, if provided, can help remove debris 1501 from the vicinity of a space 1503 during separation of the glass sheet 104 from the glass ribbon 103. In addition or alternatively, the elongated anvil member 1013 may be provided with one or more outer vacuum ports 1023a, 1023b disposed outside a respective first and second row 1005a, 1005b of suction cups 1007 to remove debris 1501 that may escape the vicinity of the space 1503 during separation of the glass sheet 104 from the glass ribbon 103.

In further embodiments, the scoring element 1019 may be provided with at least one vacuum port. For instance, as shown in FIG. 11, in one embodiment, the scoring element 1019 may be mounted within an opening of a vacuum port 1025. In some embodiments, the opening can comprise a horizontal slot that allows the scoring element 1019 to travel along a length "L" of the scoring device 1017 in direction 1702 shown in FIG. 17. As shown in FIG. 14, such vacuum port 1025, if provided, can help remove debris 1402 from the vicinity of the scoring element 1019 when scoring the second major surface 215b of the glass ribbon 103 as the scoring element 1019 travels along the length "L" of the scoring device 1017 in direction 1702.

Figure 16:
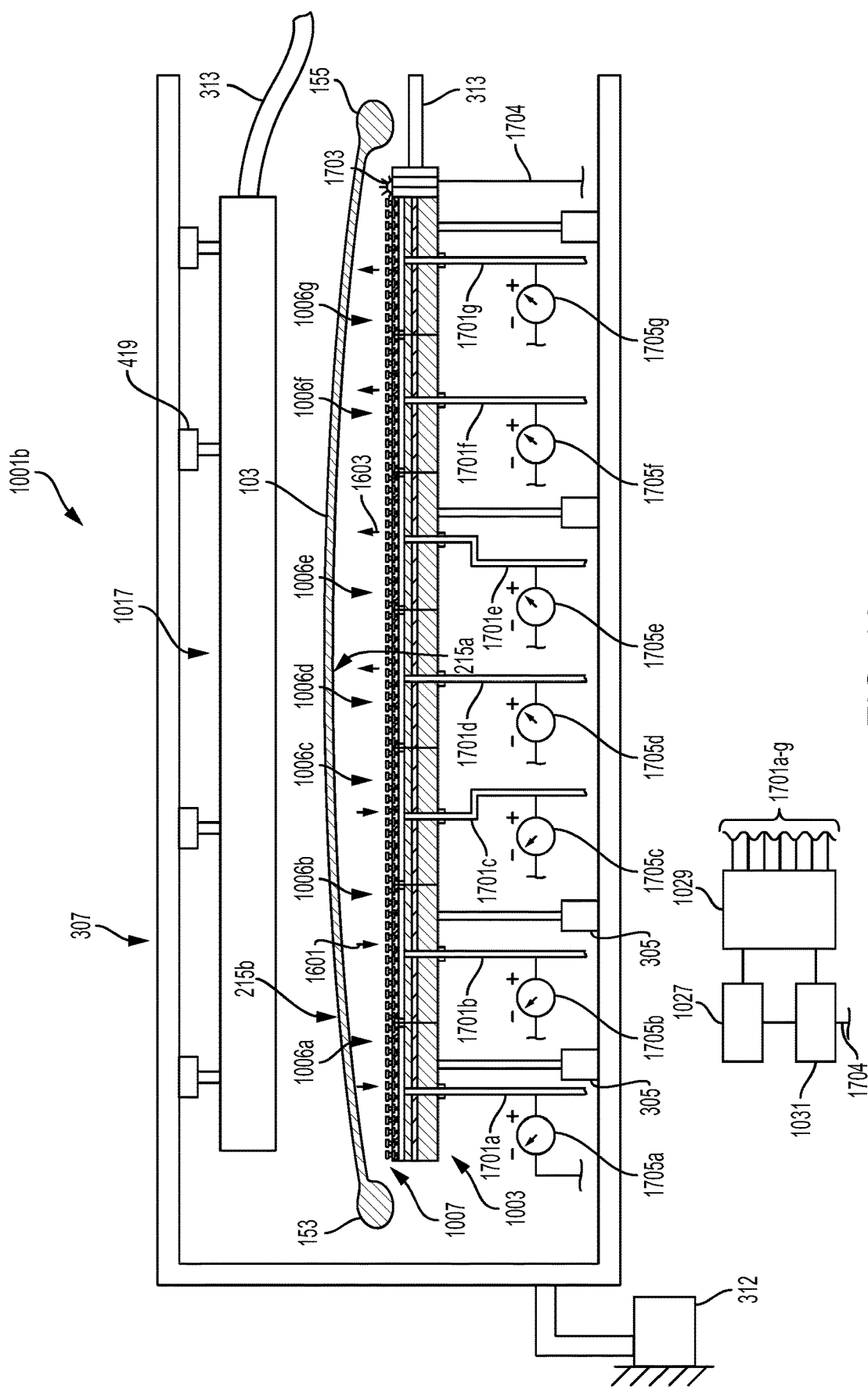
FIG. 16 illustrates a method of attaching at least one row of suction cups to a glass ribbon where the suction cups are configured in a plurality of zones that are independently operated.
Figure 17:
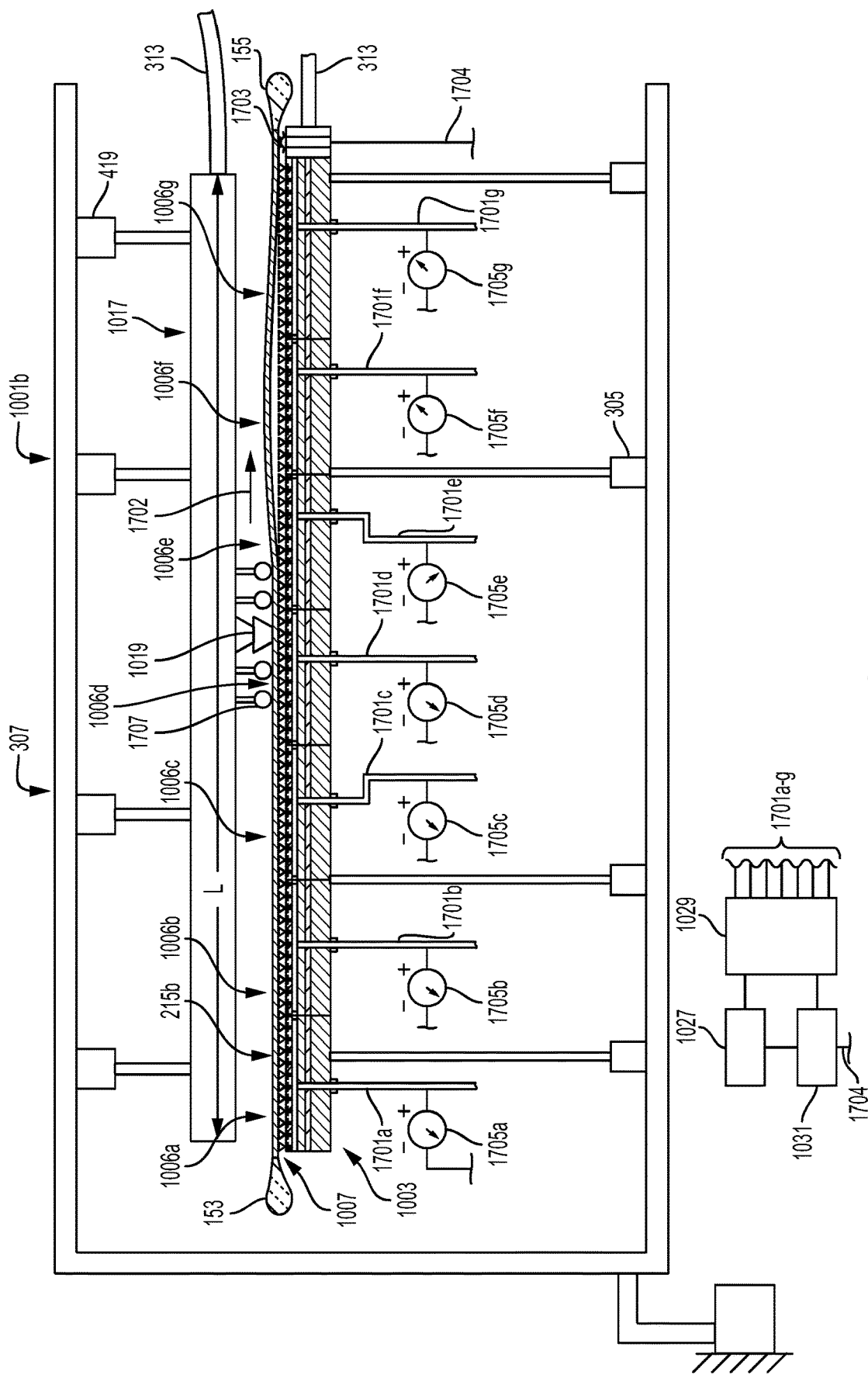
FIG. 17 further illustrates the method of FIG. 16 wherein the zones of suction cups are independently operated at different pressures to attach the suction cups to the glass ribbon while flattening the glass ribbon and producing a score line.

Referring to FIG. 11, in some embodiments, all of the suction cups 1007 of the first and second row 1005a, 1005b of suction cups 1007 may operate together under a pressure source 1027 (e.g., a compressed fluid source, vacuum source). The pressure source 1027 may be controlled directly by a controller 1031 programmed to operate the pressure source 1027. In addition or alternatively, the controller 1031 may operate a fluid manifold 1029 to control the magnitude of the pressure and/or whether the suction cups 1007 are operated under a positive pressure (e.g., compressed air) or a negative pressure (e.g., vacuum). Alternatively, the plurality of suction cups 1007 of at least one of the first row 1005a of suction cups 1007 and the second row 1005b of suction cups 1007 may be configured in at least a first zone of suction cups and a second zone of suction cups. In such embodiments, the first zone of suction cups may be configured to operate independently from the second zone of suction cups. FIGS. 16-17 illustrates the first row 1005a of suction cups 1007 comprising a plurality of zones 1006a-g that may be correspondingly placed in communication with the fluid manifold 1029 by a respective one of conduits 1701a-g. The controller 1031 may operate the fluid manifold to cause the pressure source 1027 to place each suction cup 1007 in each zone under a different pressure. The controller 1031 may also consider information from one or more proximity sensors 1703. Although one proximity sensor 1703 is illustrated, in further embodiments, a plurality of proximity sensors may be provided. For instance, each zone of 1006a-g of suction cups 1007 may be provided with at least one proximity sensor in some embodiments. Furthermore, each zone 1006a-g may include a pressure sensor 1705a-g that may also provide information by way of communication line 1704 to the controller 1031 to help operate the glass separation apparatus 1001b. Thus, at least one the zones 1006a-g of suction cups may be operated independently from another of the zones 1006a-g of the suction cups. In some embodiments, all of the zones 1006a-g of suction cups may be operated independently from each other.

In some embodiments, each pressure zone may only include suction cups from a common one of the first row 1005a of suction cups 1007 or the second row 1005b of suction cups 1007. Alternatively, as shown in FIG. 11, a fluid conduit 1033 in a base 1035 may link a plurality of suction cups 1007 of the first row 1005a of suction cups with a plurality of suction cups 1007 of the second row 1005b of suction cups together in a common zone.

Methods of separating the glass ribbon 103 with the glass separation apparatus 1001b will now be discussed with reference to FIGS. 10-17. As shown in FIG. 11, actuator(s) 305 may operate to move base 1035 together with the first and second rows 1005a, 1005b of suction cups 1007 in the first direction 1011 toward the first major surface 215a of the glass ribbon 103 until the outer distal end of the suction cups engage the first major surface 215a of the glass ribbon as shown in FIGS. 11-12. As shown in FIG. 12, the method can further attach each suction cup 1007 of the first row 1005a of suction cups 1007 to a first area 1201 of the first major surface 215a of a glass ribbon. The method can further include attaching each suction cup 1007 of the second row 1005b of suction cups 1007 to a second area 1203 of the first major surface 215a of the glass ribbon 103. As shown, the first area 1201 can be located vertically above the second area 1203.

In some embodiments, the pressure source 1027 can create vacuum in the fluid conduit 1033 to cause vacuum attachment of the suction cups 1007 to the first major surface 215a of the glass ribbon 103. As shown in FIGS. 16-17, in some embodiments, the zones 1006a-g can be placed in selective communication with the pressure source 1027 by way of fluid manifold 1029 using the controller 1031. For instance, a proximity sensor 1703 may send proximity information by way of hard-wire or wireless communication line 1704 to the controller 1031. The corresponding operating pressure of the suction cups 1007 of each zone 1006a-g can be adjusted to a predetermined pressure based on proximity information indicating the distance between the suction cups 1007 and the first major surface 215a of the glass ribbon 103. As such, a more controlled attachment and flattening of the bowed ribbon profile (e.g., see FIG. 16) or attachment of a flat or otherwise shaped ribbon can be achieved, thereby avoiding possible stress concentrations resulting in failure of the glass ribbon that may otherwise occur if the glass ribbon is snapped into engagement with the suction cups.

For instance, as shown by pressure gauges 1705a-g in FIG. 16, the proximity sensor 1703 associated with each zone 1006a-g (only one proximity sensor 1703 shown in FIGS. 16-17 for clarity) may send a corresponding proximity signal to the controller 1031. The controller can be programmed to provide a maximum vacuum pressure, as indicated by pressure gauges 1705a-c in FIG. 16 since the proximity sensors associated with zones 1006a-c indicate that the first major surface 215a is positioned greater than a predetermined distance at those locations programmed into the controller 1031. The maximum vacuum pressure can operate to pull the glass ribbon 103 towards the suction cups within zones 1006a-c as indicated by arrows 1601. As further shown in FIG. 16, the remaining zones 1006d-g may be operated under a positive pressure to provide air jets to push away the glass ribbon from the suction cups at zones 1006d-g as indicated by arrows 1603. In such a way, in combination with the bowed profile of the glass ribbon shown in FIG. 16, the suction cups 1007 of the first zone 1006a will first engage the glass ribbon 103 at that location. As the glass ribbon approaches the suction cups 1007 in each subsequent zone, the pressure can be controlled to provide controlled attachment in a direction form the first edge 153 to the second edge 155 of the glass ribbon. Once the glass ribbon is attached, either by way of suction and/or by rollers 1707 (see FIG. 17) that may optionally be associated with the vacuum device scoring element 1019, the attached zones 1006a-d may be maintained in a vacuum as indicated by pressure gauges 1705a-d in FIG. 17. Furthermore, the unattached zones 1006e-g may be operated under a positive pressure as indicated by pressure gauges 1705e-g. As such, snapping of the ribbon against the rows 1005a-b can be avoided that prevents stress fractures or vibrations, twisting or other disturbances from propagating up the glass ribbon 103 to the setting zone where imperfections may be frozen into the glass ribbon 103 in the elastic zone.

While a proximity sensor 1703 is illustrated in the drawings, controlling the pressure within zones may be achieved in other ways. For instance, rather than a proximity sensor, information from the pressure gauges 1705a-g themselves and/or the location of a carriage including the scoring element 1019 and rollers 1707 may be used to adjust the pressure of the zones 1006a-g. For instance, a pressure spike may be monitored and conveyed to the controller 1031 indicating the first zone 1006a of suction cups 1007 is attached to the first major surface 215a of the glass ribbon 103. The pressure associated with the remaining pressure zones 1006b-g may be adjusted (e.g., with reduced vacuum, or positive pressure) to provide a controlled attachment of the suction cups of the second zone 1006b. Then the pressure of the remaining pressure zones 1006c-g may be adjusted and continue, in series, to provide controlled sequential attachment of the suction cups 1007 based on the associated pressure zone 1006c-g until all of the zones of suction cups are attached to the glass ribbon. Providing controlled attachment of the suction cups 1007 in series in sequential order of the zones can prevent snapping of the glass ribbon against the suction cups; thereby avoiding stress fractures or vibrations, twisting or other disturbances from propagating up the glass ribbon 103 to the setting zone where imperfections may be frozen into the glass ribbon 103 in the elastic zone.

In a similar manner, controlling the pressure with the pressure zones 1006a-g can facilitate a controlled release of the glass ribbon 103 once the glass sheet 104 has been separated from the glass ribbon 103. Once separated, the pressure zone 1705g may be changed from a vacuum pressure to a positive pressure wherein the glass ribbon 103 is released from the suction cups in that zone. Each successive zone can be changed from a vacuum pressure to a positive pressure in series, thereby providing a controlled release of the glass ribbon from the suction cups where the glass ribbon may regain its original bowed shape shown in FIG. 16. Providing the controlled release of the glass ribbon can prevent snapping of the glass ribbon back to its original shape (e.g., the bowed shape shown in FIG. 16), thereby avoiding vibrational or other disturbances traveling upstream in the ribbon to the glass setting area where imperfections may be frozen into the glass ribbon 103.

As shown in FIG. 13, methods of separating the glass ribbon 103 can further include engaging the elongated anvil member 1013 along a third area 1205 of the first major surface 215a of the glass ribbon 103. As shown in FIG. 13, the third area 1205 is positioned at an elevation that is lower than the elevation of the first area 1201 and higher than the elevation of the second area 1203, wherein the third area 1205 is vertically positioned between the first area 1201 and the second area 1203. In such a manner, the glass ribbon is stabilized with a separation path 1301 of the second major surface 215b of the glass ribbon 103 aligned with the elongated anvil member 1013 for producing the score line 1401 shown in FIG. 14. Although not shown, in one embodiment, the vacuum within the cup 1403 (see FIG. 14) can cause the walls 1405 of the suction cups 1007 to collapse, thereby causing the elongated anvil member 1013 to move toward the first major surface 215a and even cause the elongated anvil member 1013 to engage the first major surface 215a. In addition or alternatively, the actuator(s) 1015, if provided, can move the elongated anvil member 1013 to extend outwardly relative to the base 1035 and/or relative to the suction cups 1007 to move toward the first major surface 215a and even cause the elongated anvil member 1013 to engage the first major surface 215a.

Methods of separating the glass ribbon 103 can further include producing a score line 1401 in the second major surface 215b of the glass ribbon 103 along the separation path 1301 aligned with the elongated anvil member 1013. As shown in FIG. 14, the scoring element 1019 can be extended out of the opening of the vacuum port 1025 with an actuator (not shown) to score the second major surface 215b of the glass ribbon 103. As shown in FIG. 17, in some embodiments, the scoring element 1019 can move in direction 1702, wherein the direction 1702 extends from the first edge 153 toward the second edge 155. In some embodiments, the scoring element may be mounted on a carriage that includes rollers 1707 to help smooth the glass ribbon out in a flat orientation against the elongated anvil member 1013. As such, in some embodiments, the method can include producing the score line 1401 at least partially while flattening the glass ribbon 103 against the elongated anvil member 1013, thereby reducing the processing time of scoring the glass ribbon 103. As shown, in some embodiments, the score line 1401 is less than the width "W" of the glass ribbon 103. Providing a score line 1401 less than the width "W" can help prevent the relatively thick edge portions at the first edge 153 and the second edge 155 from interfering with a continuous contact along the entire elongated anvil member 1013 to promote quick separation with relatively little movement of the anvil member 1013. Relatively little movement during separation reduces the amount of energy stored in the glass ribbon when flexing the glass ribbon during separation; thereby reducing the amount of energy released during separation to minimize stress that may damage the glass ribbon and/or promote vibrations, twisting or other movement of the glass ribbon that may propagate up the glass ribbon to the setting zone where imperfections may be frozen into the glass ribbon in the elastic zone.

During the scoring operation, the vacuum port 1025 may be used to collect debris 1402 generated during the scoring process to prevent the debris from contaminating the major surfaces of the glass ribbon. A vacuum source may be placed in communication with the conduits 313 (see FIGS. 16-17) to produce fluid flow about the scoring element 1019 as the glass ribbon is scored. As shown, the scoring element 1019 can be mounted for retraction within and out of a central portion of the vacuum port 1025 to allow the fluid flow to surround all areas of the scoring element 1019, thereby enhancing the efficiency of debris collection.

As shown in FIG. 15, methods can further include separating the glass ribbon 103 along the score line 1401 by moving at least one of the engagement device 1003 and the elongated anvil member 1013 relative to the other of the engagement device 1003 and the elongated anvil member 1013. For instance, as shown in FIG. 15, the elongated anvil member 1013 may be extended outwardly relative to the engagement device 1003 and pressed into the first major surface 215a of the glass ribbon to separate the glass sheet 104 from the glass ribbon 103 along the score line 1401. Although not shown, in another embodiment, the engagement device 1003 together with the suction cups 1007 attached to the glass ribbon 103 can be retracted relative to the elongated anvil member 1013 to pull the glass ribbon 103 against the elongated anvil member 1013 to separate the glass sheet 104 from the glass ribbon 103 along the score line 1401.

During the separation operation, the vacuum port 1025 may be used to collect debris 1501 generated during the separation process to prevent the debris from contaminating the major surfaces of the glass ribbon. Likewise, the inner vacuum ports 1021a, 1021b and the outer vacuum ports 1023a, 1023b can collect the debris 1501 generated during the separation process to further prevent the debris from contaminating the major surfaces of the glass ribbon. A vacuum source may be placed in communication with the conduits 313 (see FIGS. 16-17) to produce fluid flow into the vacuum ports 1025, 1021a-b, 1023a-b to allow the fluid flow to surround all areas of the separation, thereby enhancing the efficiency of debris collection. As shown in FIG. 15, the opening of the vacuum port 1025 may be placed in close proximity to the separation path to capture debris tending to be broken outward from the separation path.

After separation, as can be shown, the separated glass sheet may be hung from the second row 1005b of suction cups 1007 after separating the glass sheet 104 from the glass ribbon 103 without the need for a handling device that may cause force disturbances to travel up the glass ribbon 103 to the setting zone where imperfections may be frozen into the glass ribbon 103. Furthermore, during separation, the first row 1005a of suction cups 1007 also remains attached to the lower separated portion of the glass ribbon, thereby providing stability and helping isolate the glass ribbon from force disturbances that may promote damage or generate vibrations, twisting, buckling or other movement up the glass ribbon to the setting zone where imperfections may be frozen into the glass ribbon 103 in the elastic zone.

In some embodiments of the disclosure, the glass separation apparatus 101b, 1001b can provide both the engagement device 301, 1003 and the elongated anvil member 413, 1013 mounted on the same carriage 307. As further shown, the glass separation apparatus 101b, 1001b can provide the scoring element 421, 1019 that is likewise mounted on the same carriage 307. Thus, as shown, the carriage 307 can be moved together with the engagement device 301, 1003, the elongated anvil member 413, 1013 and the scoring element 421, 1019. In some embodiments, methods of the disclosure can include moving the carriage 307 (e.g., with actuator 312) at a speed in the travel direction (e.g., draw direction 211) that matches a speed of the glass ribbon 103 traveling in the travel direction (e.g., draw direction 211) while separating the glass ribbon along the score line 801, 1401. Moving the carriage together with the engagement device and the elongated anvil member can help minimize force disturbances that may otherwise occur if mounting a portion of the separation apparatus relative to ground where mismatching of speeds can result in force spikes that may damage the glass ribbon or promote propagation of vibrations, twisting, buckling or other movement up the glass ribbon to the setting zone where imperfections may be frozen into the glass ribbon 103 in the elastic zone. The engagement device 301, 1003 and the elongated anvil member 413, 1013 are mounted for movement together with the carriage 307 where such mismatch in speeds between the engagement device and elongated anvil member are avoided.

Furthermore, due to the focused application of force along the score line 801, 1401, a relatively small movement between the elongated anvil member row 413, 1013 and the engagement device 301, 1003 results in effective separation of the glass sheet 104 from the glass ribbon 103. A satisfactory range of movement to create bending stress may be, for example, 0.25 mm to 1.5 mm although other distances may be provided in further embodiments. The concentration of stress along the score line with support by the engagement device and the elongated anvil member reliably separates the glass ribbon with low energy input, which allows the ribbon to stay stable during separation. As such, the lower energy input can avoid vibrations and movement up the glass ribbon to the setting area where imperfections that may be frozen into the glass ribbon.

In some embodiments, as discussed above, the glass separation apparatus 101b, 1001b of the present disclosure can include producing the score line 801, 1401 while at least partially while flattening a bowed or other shaped glass ribbon 103 against the elongated anvil member 413, 1013. Scoring while flattening can reduce the time necessary to score a ribbon that has a bowed or other shape that requires flattening prior to scoring.

Once separated, as shown in FIG. 1, in some embodiments, the separated glass sheet 104 may be moved by the glass sheet handling device 163 to the glass handling apparatus 101c for further processing. In some embodiments, further processing can include removing edge portions of the glass ribbon, further separating the glass ribbon or other processing steps.

What is claimed is:

1. A glass manufacturing apparatus comprising:
   an engagement device comprising: a first elongated member extending along a first elongated axis and rotatable about a first rotation axis extending along a direction at a first nonzero angle relative to a direction of the first elongated axis, and a second elongated member extending along a second elongated axis and rotatable about a second rotation axis extending along a direction at a second nonzero angle relative to a direction of the second elongated axis, wherein the second elongated member is spaced from the first elongated member in the direction of the first rotation axis;
   an elongated anvil member aligned with a space disposed between the first elongated member and the second elongated member; and
   one or more actuators configured to apply a rotational force to the first elongated member and the second elongated member to rotate the first elongated member about the first rotation axis and the second elongated member about the second rotation axis.

2. The glass manufacturing apparatus of claim 1, wherein the engagement device and the elongated anvil member are mounted on a carriage.

3. The glass manufacturing apparatus of claim 1, wherein the first rotation axis is coincident with the second rotation axis.

4. The glass manufacturing apparatus of claim 1, wherein a common plane extends along the direction of the first elongated axis, the direction of the second elongated axis, the direction of the first rotation axis, and the direction of the second rotation axis.

5. The glass manufacturing apparatus of claim 1, further comprising a scoring element movable relative to the elongated anvil member.

6. The glass manufacturing apparatus of claim 5, wherein the scoring element is movable within the space disposed between the first elongated member and the second elongated member.

7. A method of separating a glass ribbon with the glass manufacturing apparatus of claim 1 comprising:

contacting a first major surface of the glass ribbon with the elongated anvil member, the glass ribbon comprising a width extending from a first outer edge of the glass ribbon to a second outer edge of the glass ribbon;

contacting a portion of a second major surface of the glass ribbon with the first elongated member and the second elongated member;

rotating the first elongated member about the first rotation axis and the second elongated member about the second rotation axis with the one or more actuators to begin spreading apart the first outer edge and the second outer edge;

scoring the second major surface of the glass ribbon to produce a score line within the second major surface of the glass ribbon along a separation path aligned with the elongated anvil member; and then separating the glass ribbon along the score line by moving one of the engagement device and the elongated anvil member relative to the other of the engagement device and the elongated anvil member.

8. The method of claim 7, wherein the engagement device and the elongated anvil member are each mounted on a carriage, and the method comprises moving the carriage at a speed in a travel direction that matches a speed of the glass ribbon traveling in the travel direction while separating the glass ribbon along the score line.

9. The method of claim 7, wherein at least a portion of scoring of the second major surface of the glass ribbon is conducted without entirely spreading apart the first outer edge and the second outer edge to flatten the width of the glass ribbon against the elongated anvil member.

10. The method of claim 7, wherein at least a portion of scoring the second major surface is conducted while rotating the first elongated member about the first rotation axis and the second elongated member about the second rotation axis with the one or more actuators.

11. The method of claim 7, further comprising vacuuming debris during at least one of scoring the second major surface of the glass ribbon and separating the glass ribbon along the score line.

12. A method of separating a glass ribbon with a glass manufacturing apparatus comprising an engagement device comprising: a) a first elongated member extending along a first elongated axis and rotatable about a first rotation axis extending along a direction at a first nonzero angle relative to a direction of the first elongated axis, and a second elongated member extending along a second elongated axis and rotatable about a second rotation axis extending along a direction at a second nonzero angle relative to a direction of the second elongated axis, wherein the second elongated member is spaced from the first elongated member in the direction of the first rotation axis; and b) an elongated anvil member aligned with a space disposed between the first elongated member and the second elongated member, the method comprising:

contacting a first major surface of the glass ribbon with the elongated anvil member, the glass ribbon comprising a width extending from a first outer edge of the glass ribbon to a second outer edge of the glass ribbon;

contacting a portion of a second major surface of the glass ribbon with the first elongated member and the second elongated member;

rotating the first elongated member about the first rotation axis and the second elongated member about the second rotation axis to begin spreading apart the first outer edge and the second outer edge;

scoring the second major surface of the glass ribbon to produce a score line within the second major surface of the glass ribbon along a separation path aligned with the elongated anvil member; and then separating the glass ribbon along the score line by moving one of the engagement device and the elongated anvil member relative to the other of the engagement device and the elongated anvil member.

13. The method of claim 12, wherein at least a portion of scoring of the second major surface of the glass ribbon is conducted while partially but not entirely spreading apart the first outer edge and the second outer edge.

14. The method of claim 13, wherein at least a portion of scoring the second major surface is conducted while rotating the first elongated member about the first rotation axis and the second elongated member about the second rotation axis.

15. The method of claim 12, wherein the engagement device and the elongated anvil member are each mounted on a carriage, and the method comprises moving the carriage at a speed in a travel direction that matches a speed of the glass ribbon traveling in the travel direction while separating the glass ribbon along the score line.

16. The method of claim 12, further comprising vacuuming debris during at least one of scoring the second major surface of the glass ribbon and separating the glass ribbon along the score line.

* * * * *